(12) United States Patent
Tippmann et al.

(10) Patent No.: US 12,188,671 B2
(45) Date of Patent: Jan. 7, 2025

(54) MODULAR HEAT TRANSFER SYSTEM

(71) Applicant: Tippmann Engineering, LLC, Fort Wayne, IN (US)

(72) Inventors: Daniel J. Tippmann, Fort Wayne, IN (US); Robert T. Tippmann, III, Fort Wayne, IN (US)

(73) Assignee: Tippmann Engineering, LLC, Fort Wayne, IN (US)

( * ) Notice: Subject to any disclaimer, the term of this patent is extended or adjusted under 35 U.S.C. 154(b) by 0 days.

(21) Appl. No.: 18/359,261

(22) Filed: Jul. 26, 2023

(65) Prior Publication Data
US 2023/0366578 A1 Nov. 16, 2023

Related U.S. Application Data

(63) Continuation of application No. 16/938,837, filed on Jul. 24, 2020, now Pat. No. 11,713,896.
(Continued)

(51) Int. Cl.
*F24F 11/62* (2018.01)
*F24F 11/49* (2018.01)
(Continued)

(52) U.S. Cl.
CPC .............. *F24F 11/62* (2018.01); *F24F 11/49* (2018.01); *F24F 11/56* (2018.01); *G05B 19/042* (2013.01);
(Continued)

(58) Field of Classification Search
CPC .. F24F 11/62; F24F 11/49; F24F 11/56; F24F 2110/10; F24F 2110/40; F24F 2130/00;
(Continued)

(56) References Cited

U.S. PATENT DOCUMENTS

| 11,300,662 B1 * | 4/2022 | Milton .................... G01S 17/06 |
| 2009/0076645 A1 * | 3/2009 | Ben-Tzur ................. A23B 7/00 |
| | | 700/213 |

(Continued)

FOREIGN PATENT DOCUMENTS

| EP | 2517956 B1 * | 12/2016 | ............... B64C 1/20 |
| WO | WO-2005024795 A2 * | 3/2005 | ........... G01K 13/006 |

OTHER PUBLICATIONS

Badia-Melis, R., Emond, J.P., Ruiz-García, L., Garcia-Hierro, J. and Villalba, J.R., 2017. Explorative study of using infrared imaging for temperature measurement of pallet of fresh produce. Food Control, 75, pp. 211-219. (Year: 2017).*

(Continued)

*Primary Examiner* — Alicia M. Choi
(74) *Attorney, Agent, or Firm* — Bailey Legal Services, PLLC

(57) ABSTRACT

A system and method controls a heat transfer system for palletized product. A controller and an array of sensors cooperate to control chillers and fans to efficiently change the temperature of product within the cases, while collecting and providing data regarding the efficacy and overall spatial profile of the freezing or other temperature-control operation. These data can be used to provide user feedback, optimize the temperature-control process, and ensure a desired performance of the system.

26 Claims, 29 Drawing Sheets

Related U.S. Application Data

(60) Provisional application No. 63/012,654, filed on Apr. 20, 2020.

(51) Int. Cl.
*F24F 11/56* (2018.01)
*G05B 19/042* (2006.01)
*F24F 110/10* (2018.01)
*F24F 110/40* (2018.01)
*F24F 130/00* (2018.01)

(52) U.S. Cl.
CPC ....... *F24F 2110/10* (2018.01); *F24F 2110/40* (2018.01); *F24F 2130/00* (2018.01); *G05B 2219/2614* (2013.01)

(58) Field of Classification Search
CPC ........ F24F 11/64; F24F 11/77; F24F 2120/10; F24F 11/89; G05B 19/042; G05B 2219/2614; G05B 15/02; G06Q 10/087
See application file for complete search history.

(56) References Cited

U.S. PATENT DOCUMENTS

| | | | |
|---|---|---|---|
| 2014/0208795 A1* | 7/2014 | Bell | A23L 3/3418 |
| | | | 426/418 |
| 2015/0300887 A1* | 10/2015 | Mandava | G01N 33/02 |
| | | | 702/130 |
| 2018/0114415 A1* | 4/2018 | Mattingly | G08B 21/182 |
| 2019/0032987 A1* | 1/2019 | Tippmann | F25D 17/005 |
| 2019/0195695 A1* | 6/2019 | Millhouse | G08B 19/02 |
| 2021/0009310 A1* | 1/2021 | Moeller | G06K 19/07786 |

OTHER PUBLICATIONS

Badia-Melis, R., Qian, J.P., Fan, B.L., Hoyos-Echevarria, P., Ruiz-García, L. and Yang, X.T., 2016. Artificial neural networks and thermal image for temperature prediction in apples. Food and Bioprocess Technology, 9, pp. 1089-1099. (Year: 2016).*

* cited by examiner

FIG_4

FIG_6

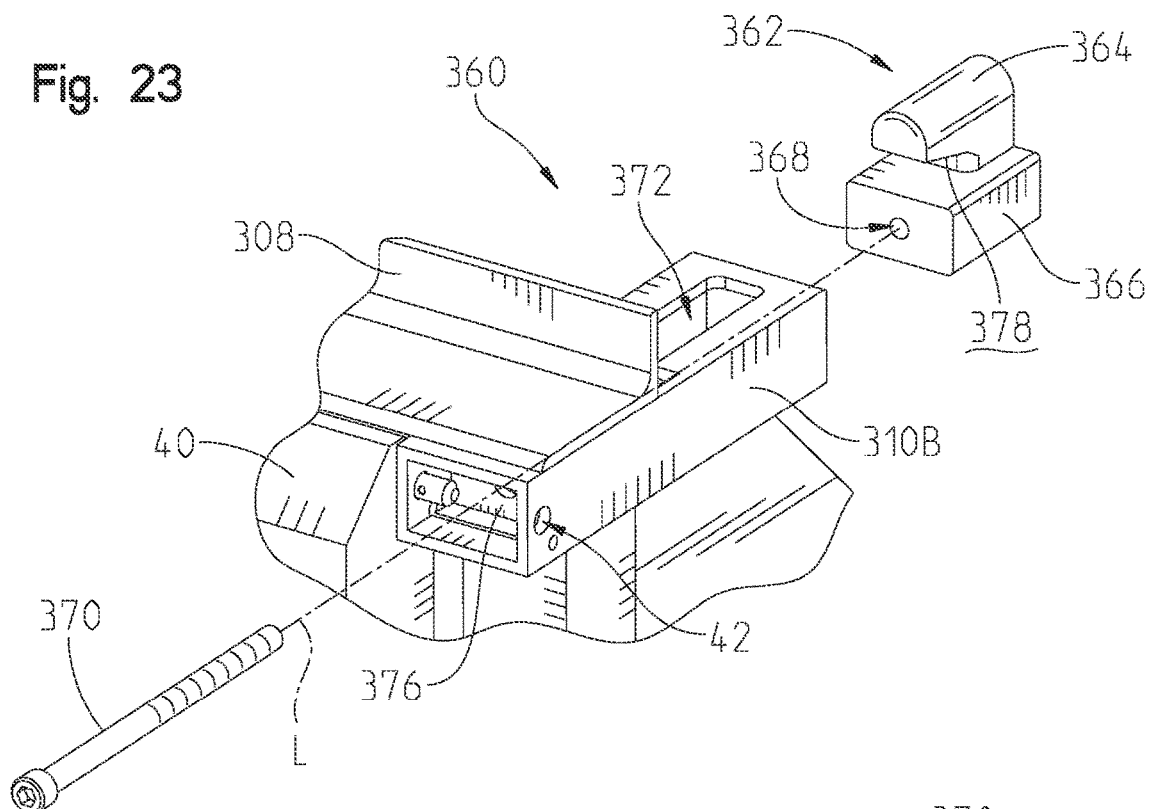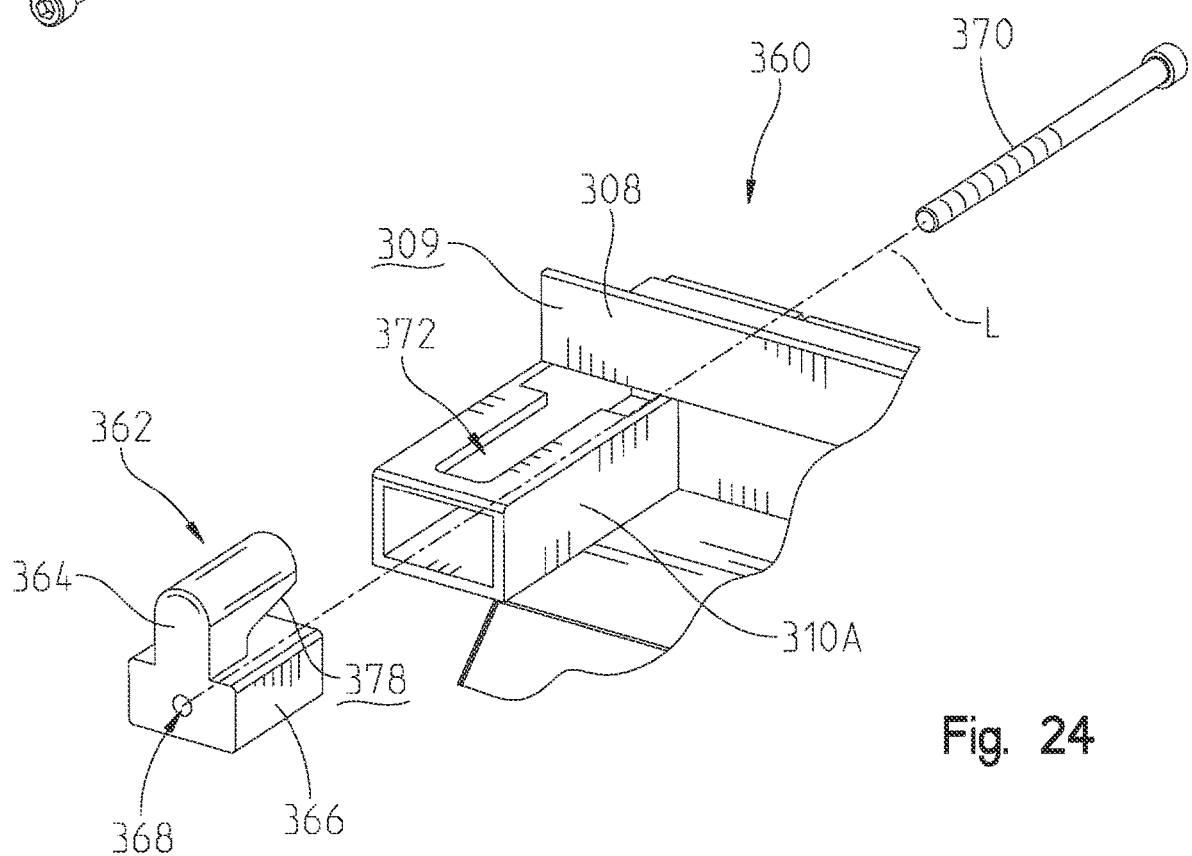

MODULAR HEAT TRANSFER SYSTEM

CROSS-REFERENCE TO RELATED APPLICATION

This application is a continuation of U.S. patent application Ser. No. 16/938,837, filed Jul. 24, 2020 and entitled MODULAR HEAT TRANSFER SYSTEM, now U.S. Pat. No. 11,713,896, which claims the benefit of U.S. Provisional Patent Application Ser. No. 63/012,654, filed Apr. 20, 2020 and entitled MODULAR HEAT TRANSFER SYSTEM, the entire disclosures of which are hereby expressly incorporated herein by reference.

BACKGROUND

1. Technical Field

The present disclosure relates to palletized product warehousing and treatment. More particularly, the present disclosure relates to control systems programmed to alter and/or hold steady the temperature of a quantity of palletized product.

2. Description of the Related Art

Freezer warehouses are known in which large pallets of items including meats, fruit, vegetables, prepared foods, and the like are frozen in blast rooms of a warehouse and then are moved to a storage part of the warehouse to be maintained at a frozen temperature until their removal.

U.S. Pat. No. 8,783,047 entitled "Rack-Aisle Freezing System for Palletized Product", filed on Sep. 8, 2010, the entire disclosure of which is hereby explicitly incorporated by reference herein, relates to an improved system for freezing food products. Shown in FIG. 1 is a large warehouse 2 that can be used to freeze and maintain perishable foods or like products. Large pallets of items, including meats, fruits, vegetables, prepared foods, and the like, are sent to warehouse 2 to be frozen employing a system whereby the palletized foods are frozen on storage racks.

FIG. 2 shows a top view of the interior of warehouse 2, in which rows of palletized product are shown such that pallet assemblies 52 abut chamber 6. As shown in FIG. 3, rows of racking 14 (see also FIG. 8) are positioned between aisles 10 and chambers 6. Each chamber 6 is enclosed by a pair of end walls 15 and top panel 17. Spacers 20 (FIGS. 5-7) separate respective rows of cases 22 to create a palletized product stack in the form of pallet assembly 52 which can be disposed and sealed against the exterior of racking 14 (FIG. 3) via forklifts 18 (see, e.g., FIGS. 3 and 4).

Air handlers 8, e.g., chillers or heaters (FIG. 2) provided in the interior of warehouse 2 produce conditioned, e.g., cold or warmed air and maintain the temperature of ambient air within the warehouse space at a desired temperature, e.g., +55° F. to −30° F. Thus, for purposes of the present disclosure, "air conditioner" refers to an air handler which can produce air conditioned to a desired state, e.g., heated or cooled. While warehouse 2 could be utilized to either freeze, cool or thaw a quantity of product housed in cases contained on pallet assemblies 52, the remaining description will use the example of a warehouse freezer, it being understood that similar arrangements and principles will be applied to a warehouse utilized to thaw product, with the air handler comprising a heater as opposed to a chiller.

Adjacent pairs of racking structures 14 (FIGS. 2-4) define a plurality of adjacent airflow chambers 6 (FIGS. 2 and 4) having air intake openings on opposite sides thereof and a plurality of air outlets having air moving devices, such as exhaust fans 12, on top panels 17, which cause conditioning air to be drawn into chambers 6 through the air intake openings in racking 14 and to then exhaust into the warehouse space. The plurality of airflow chambers 6 are each defined by a pair of end walls 15 and top wall 17 having one or more air outlets and exhaust fans 12 associated therewith (FIG. 3). Pallet assemblies 52 (FIG. 5) are pressed against the intake openings in racking 14 such that a seal is formed between the pallets and the intake openings via side periphery seals, a bottom periphery seal, and a top periphery seal. The seals together define each respective intake opening. Freezing air is drawn through air pathways 16 (FIGS. 2, 4, and 5) within the palletized product in a direction towards chamber 6 to thereby quickly freeze the product. As shown in FIG. 5, spacers 20 may be placed between rows of cases 22 of product in an attempt to provide air pathways 24 through which airflow can enter chamber 6.

U.S. Pat. No. 8,919,142 entitled "Swing Seal for a Rack-Aisle Freezing and Chilling System", filed on Mar. 29, 2011, the entire disclosure of which is hereby explicitly incorporated by reference herein, discloses a top periphery seal 40 (which may be referred to herein as a "swing seal") useable to seal an intake opening as described above and which automatically adjusts to the height of pallet assembly 52 as illustrated in FIG. 6. As illustrated in FIG. 6, pallet assembly 52 (comprised of a plurality of cases 22 stacked on spacers 20 and pallet 4) can be positioned along pallet guide 56 and pressed against airflow opening 54 such that a seal is formed between pallet assembly 52 and airflow opening 54 via side periphery seals, a bottom periphery seal and an automatically adjustable top periphery seal surrounding airflow opening 54. With such a construction, chilling or freezing air is drawn through air pathways 16 formed through pallet assembly 52, as illustrated in FIGS. 2, 4 and 5.

SUMMARY

The present disclosure provides a system and method for controlling a heat transfer system for palletized product. A controller and an array of sensors cooperate to control chillers and fans to efficiently change the temperature of product within the cases, while collecting and providing data regarding the efficacy and overall spatial profile of the freezing or other temperature-control operation. These data can be used to provide user feedback, optimize the temperature-control process, and ensure a desired performance of the system.

In one form thereof, the present disclosure provides a palletized product temperature management system, including a pallet rack having a plurality of bays, an air handler positioned and configured to drive an airflow through at least one of the plurality of bays, and a control system. Each bay defines a bay width sized to receive a palletized product assembly including a pallet with a plurality of stacked cases received thereon, a bay height sized to receive the palletized product assembly, and a bay depth sized to receive the palletized product assembly. The control system includes a temperature sensor configured and positioned to sense a temperature of the palletized product assembly, a timer, and a controller programmed to issue a signal activating, deactivating or otherwise controlling the air handler and to receive a signal indicative of a temperature at the temperature sensor, the controller programmed to record the signal at a plurality of times determined by the timer to create a time/temperature record for the temperature sensor.

In another form thereof, the present disclosure provides a control system for a pallet rack assembly including a plurality of temperature sensors configured to sense a plurality of temperatures at different locations on or within a palletized product assembly, a timer, and a controller programmed to receive a signal indicative of a temperature at each of the plurality of temperature sensors, the controller programmed to record the signal at a plurality of times determined by the timer to create a time/temperature record for each of the plurality of temperature sensors.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, where:

FIG. 23 is a perspective, exploded view of the attaching mechanism shown in FIG. 22;

FIG. 24 is another perspective, exploded view of the attaching mechanism of FIG. 23;

Figure 1:
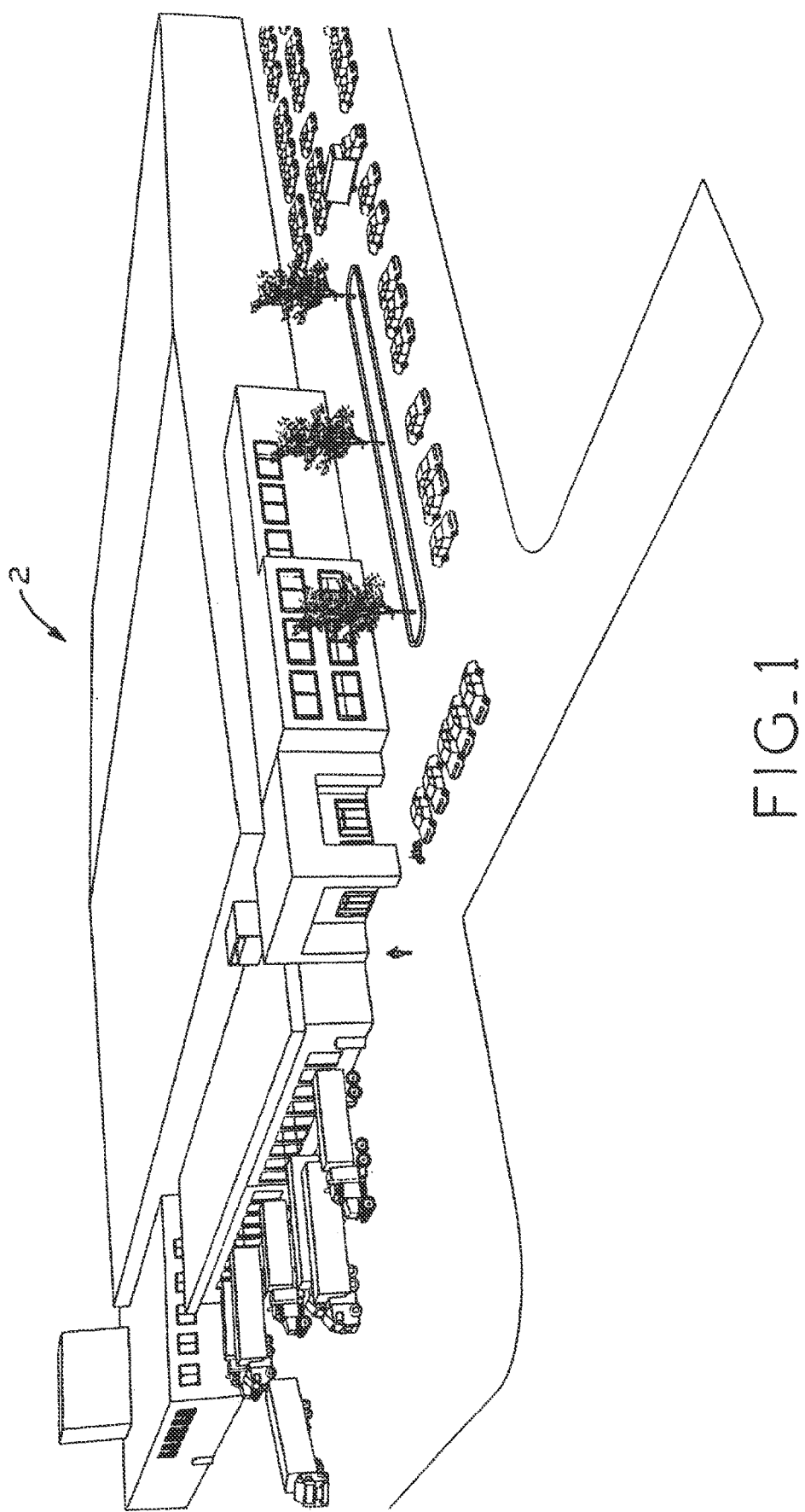
FIG. 1 is a perspective view of a warehouse incorporating a heat transfer system in accordance with the present disclosure.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION

The present disclosure provides air handler assemblies 102, 302, shown in FIGS. 10-14 and 15-26 respectively, which can be modularly installed and activated within a rearward bay of a "2-deep" rack assembly 100 in order to induce a flow of air through a pallet assembly 52 located in the adjacent forward bay of the rack assembly 100. As described in detail below, individual air handler assemblies 102, 302 may be activated when a palletized product assembly 52 is placed in the adjacent forward bay, and deactivated when the palletized product assembly 52 is absent from the adjacent forward bay. In this way, air handler assemblies 102, 302 may be used to efficiently and effectively induce a heat transferring airflow through and among cases 22 of palletized product contained on assemblies 52, while avoiding any unnecessary airflow through empty pallet bays.

1. Palletized Product Environment, Assembly and Arrangement.

Figure 2:
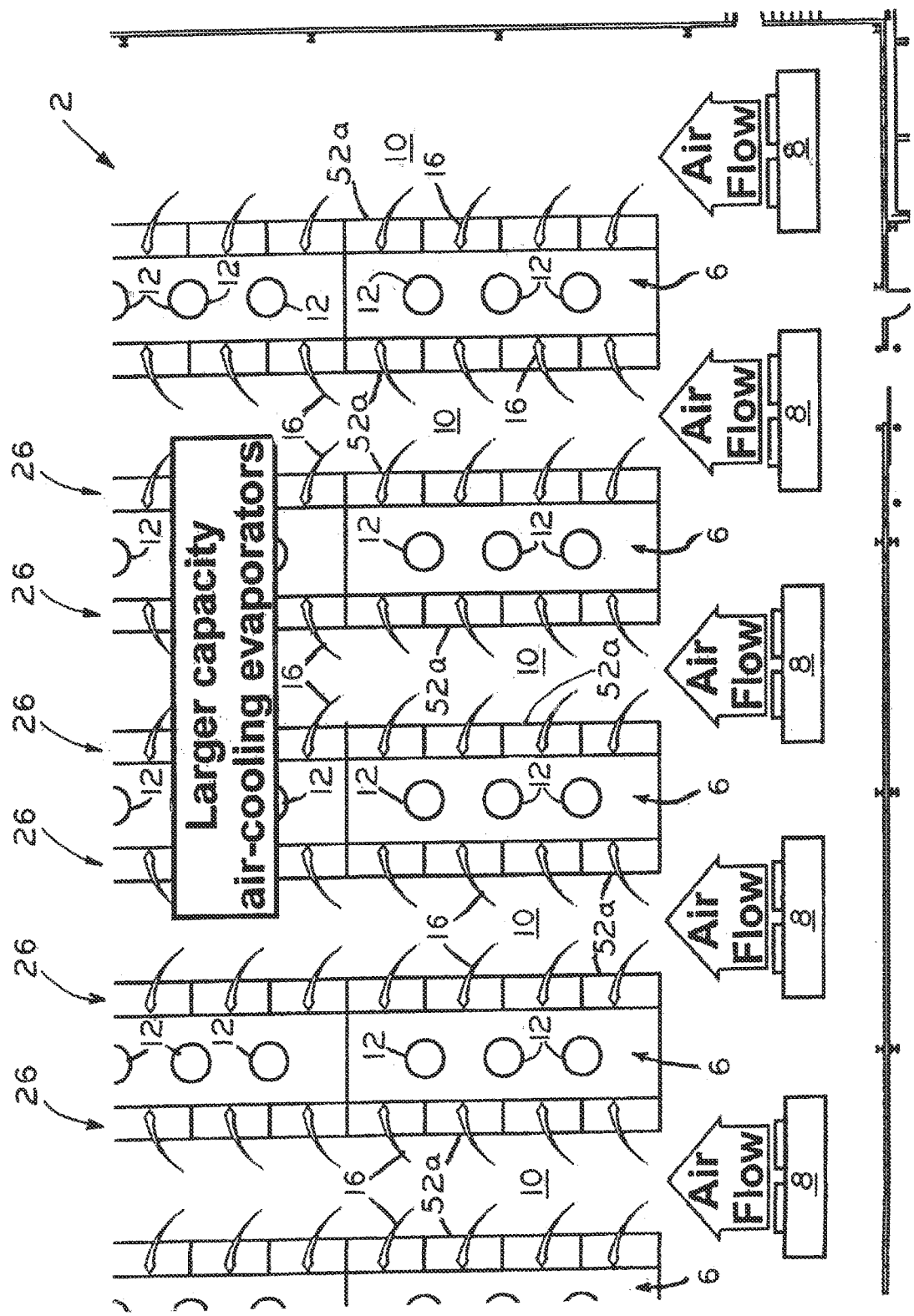
FIG. 2 is a diagrammatic top view of a heat transfer warehouse incorporating the system of the present disclosure.
Figure 3:
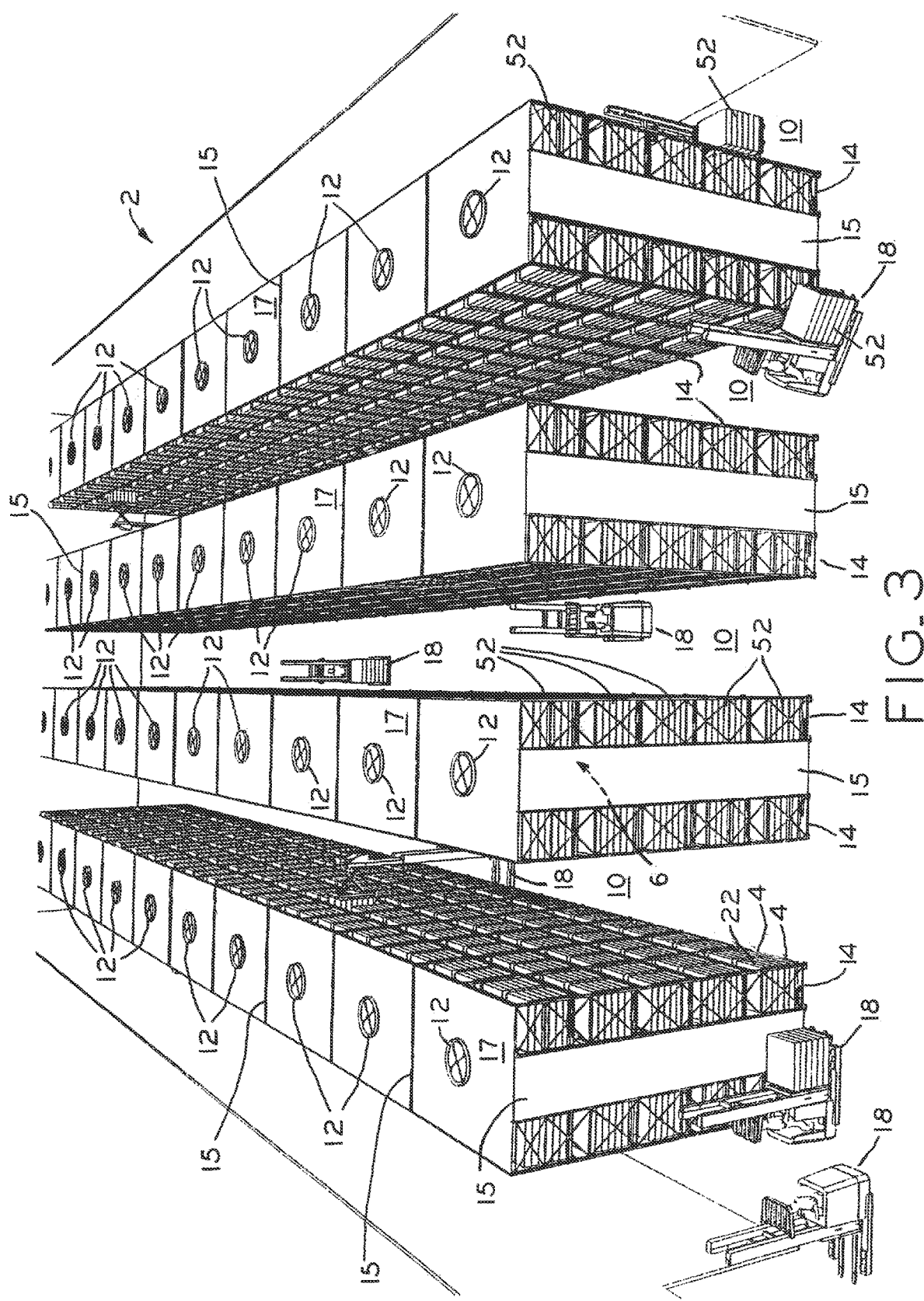
FIG. 3 is a perspective view of the interior of the warehouse illustrated in FIG. 1.
Figure 4:
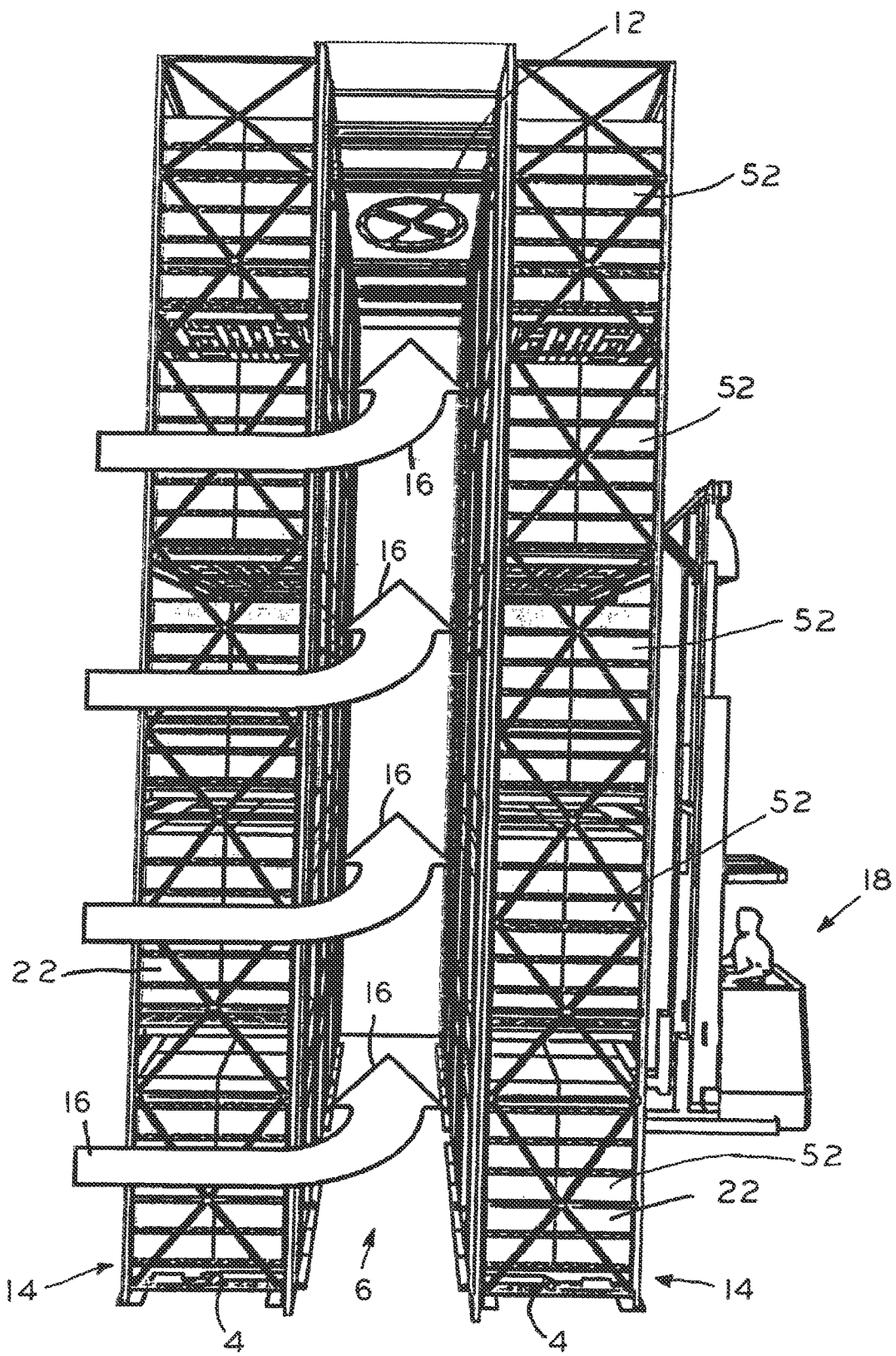
FIG. 4 is a perspective, end view of two rows of racking separated by an airflow chamber.

Pallet assemblies 52 form a part of warehouse installation 2 depicted, e.g., in FIG. 2. The general structure and components of warehouse 2 are described above in the background section of this document. A portion of this description will be repeated here to facilitate an understanding of the present invention. As illustrated in FIG. 2, warehouse 2 includes rack rows 26 separated by chambers 6 and aisles 10. As illustrated in FIGS. 3 and 4, racks 14 are sized for receiving a plurality of pallet assemblies 52. Racking 14 can be sized to receive a different number of pallet assemblies, as necessary. Different assemblies of racking 14 are illustrated, e.g., in FIGS. 3, 4, 8 and 10. As described in further detail below, "2-deep" racking 100 (shown in FIGS. 10 and 11) may be used interchangeably with racking 14 to facilitate the deployment of modular air handler assemblies 102, 302 (best shown in FIGS. 11 and 16A).

Figure 9:
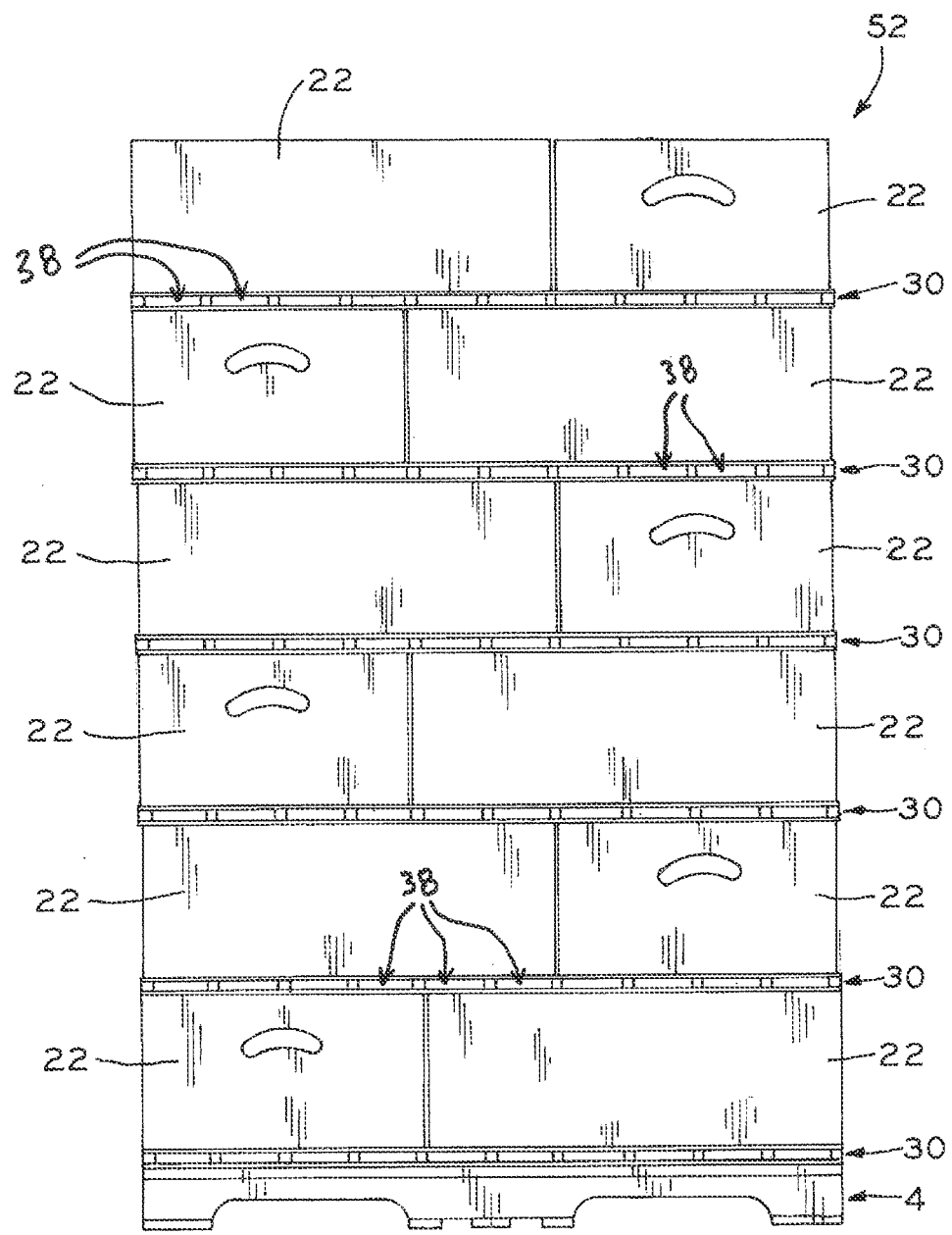
FIG. 9 is a side elevation view of a pallet assembly in accordance with the present disclosure.

As depicted, e.g., in FIG. 9, pallet assemblies 52 include pallet 4, on which a plurality of cases 22 are stacked, with spacers 30 interposed between layers of cases 22. Spacers 30 are provided to facilitate airflow across the entire downstream extent of pallet assemblies 52, thereby ensuring heat transferring airflows to all of cases 22 among the various layers stacked upon pallets 4. Exemplary spacers and other racking systems and structures which may be used in conjunction with the present disclosure are described in U.S. Patent Application Publication No. 2014/0273793, filed Jan. 28, 2014 and entitled HEAT TRANSFER SYSTEM FOR WAREHOUSED GOODS, and in U.S. Patent Application Publication No. 2014/0273801, filed Mar. 15, 2013 and entitled SPACER FOR A WAREHOUSE RACK-AISLE HEAT TRANSFER SYSTEM, the entire disclosures of which are hereby explicitly incorporated herein by reference.

With pallet assemblies 52 arranged in rows and columns on racks 14 or racks 100, warehouse installation 2 can be utilized to raise, lower and/or maintain the temperature of a quantity of product contained in cases 22 to a desired set point. As illustrated in FIGS. 3 and 4, aisles 10 are sufficiently wide to allow forklifts 18 to access pallet assemblies 52. Typical aisle width is between 5 feet to 14 feet depending on the type of lift equipment. Pallet assemblies 52 each include a pallet 4 at the bottom thereof. As used in this document, "pallet" is used to denote a standard warehouse pallet of box section open at least two ends (some pallets are called 4-way pallets due to fork openings on all 4-sides) to allow the entry of the forks of a forklift so that a palletized load, i.e., pallet assembly 52, can be raised, moved about and set down easily.

Racks 14 define airflow openings 54 fluidly connected to a chamber 6, which, in the exemplary embodiment illustrated, is enclosed by a pair of end walls 15 and top panel 17. Pallet assemblies 52 are disposed and sealed against the air intake openings formed in racks 14, as described in detail below. Referring to FIG. 2, air handlers 8 are operably connected to (e.g., disposed within) warehouse space 2 so that air handlers 8 can condition (e.g., heat or cool) the ambient air in warehouse space to a desired temperature. In the event that warehouse space 2 is utilized to freeze product contained in cases 22, air handlers 8 may be chillers which produce air on the order of −5° F. to −30° F. In the event that warehouse space 2 is utilized to thaw product contained in cases 22, air handlers 8 may be heaters which produce air on the order of 30° F. to 60° F. Additional air handlers, illustratively fans 12, circulate ambient air conditioned by air handlers 8 such that air conditioned by air handlers 8 flows through pallet assemblies 52 and through airflow openings 54 formed in racks 14. Moreover, rack assembly 100 may be used for various heat transfer operations including freezing, thawing, chilling, heating or tempering of product contained within cases 22. Air handlers 8 may be provided in any configuration consistent with any of these operations, and may be operable to condition the air within warehouse space 2 in any desired manner as required or desired for a particular application, including conditioning for a particular temperature and/or humidity.

In one exemplary embodiment, pallet 4 defines a standard 40 inch by 48 inch rectangular outer perimeter. With such a pallet, the upper and lower surfaces of spacer 30 illustrated in FIG. 9 will both be substantially rectangular in shape and about 40 inches by about 48 inches. Stated another way, the upper and lower surfaces are both nominally rectangular and nominally measure about 40 inches by 48 inches. In certain alternative embodiments, spacers 30 will be slightly oversized with respect to pallet 4, e.g., by having an overhang of up to an inch relative to the perimeter of pallet 4. These embodiments are also considered to be sized and shaped "about congruent" to the outer perimeter of pallet 4. Alternative pallet sizes, such as a standard European pallet may be utilized. Spacers 30 may be about congruent with the pallet and cases with which the spacers 30 are paired.

Figure 5:
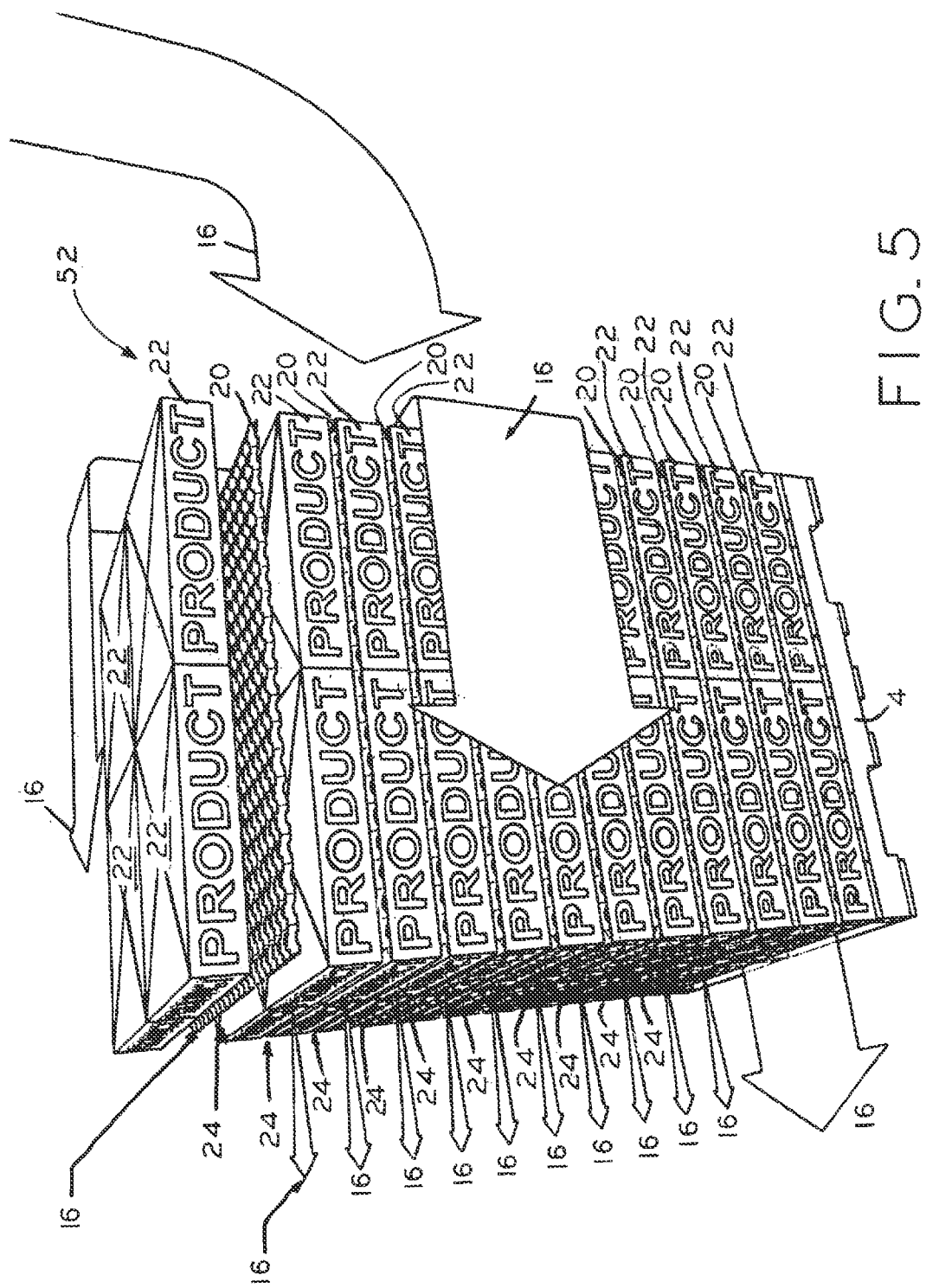
FIG. 5 is a perspective view showing a desired airflow through a pallet assembly.
Figure 6:
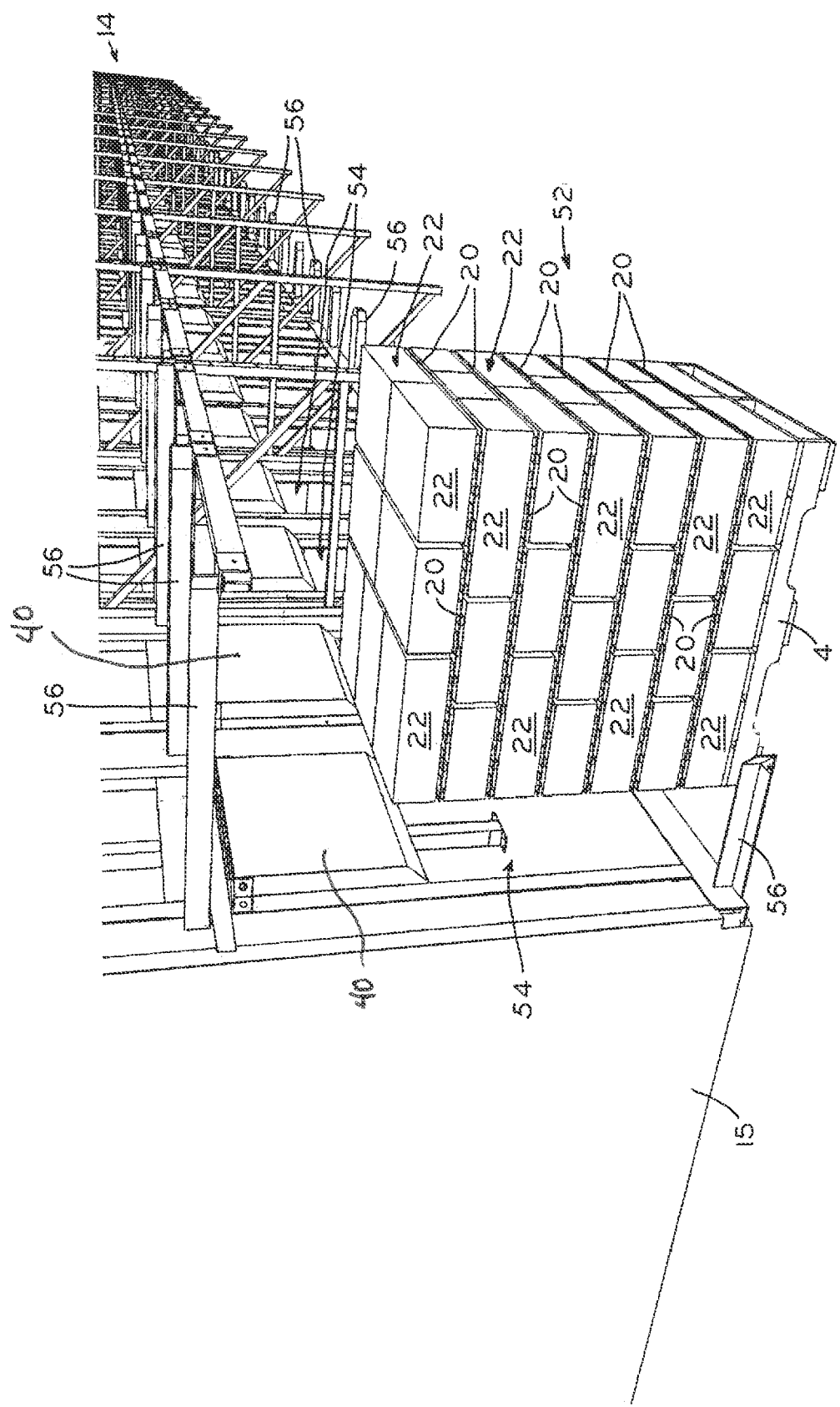
FIG. 6 is a perspective view illustrating loading of pallet assemblies into the racking illustrated, e.g., in FIGS. 3 and 4.
Figure 7:
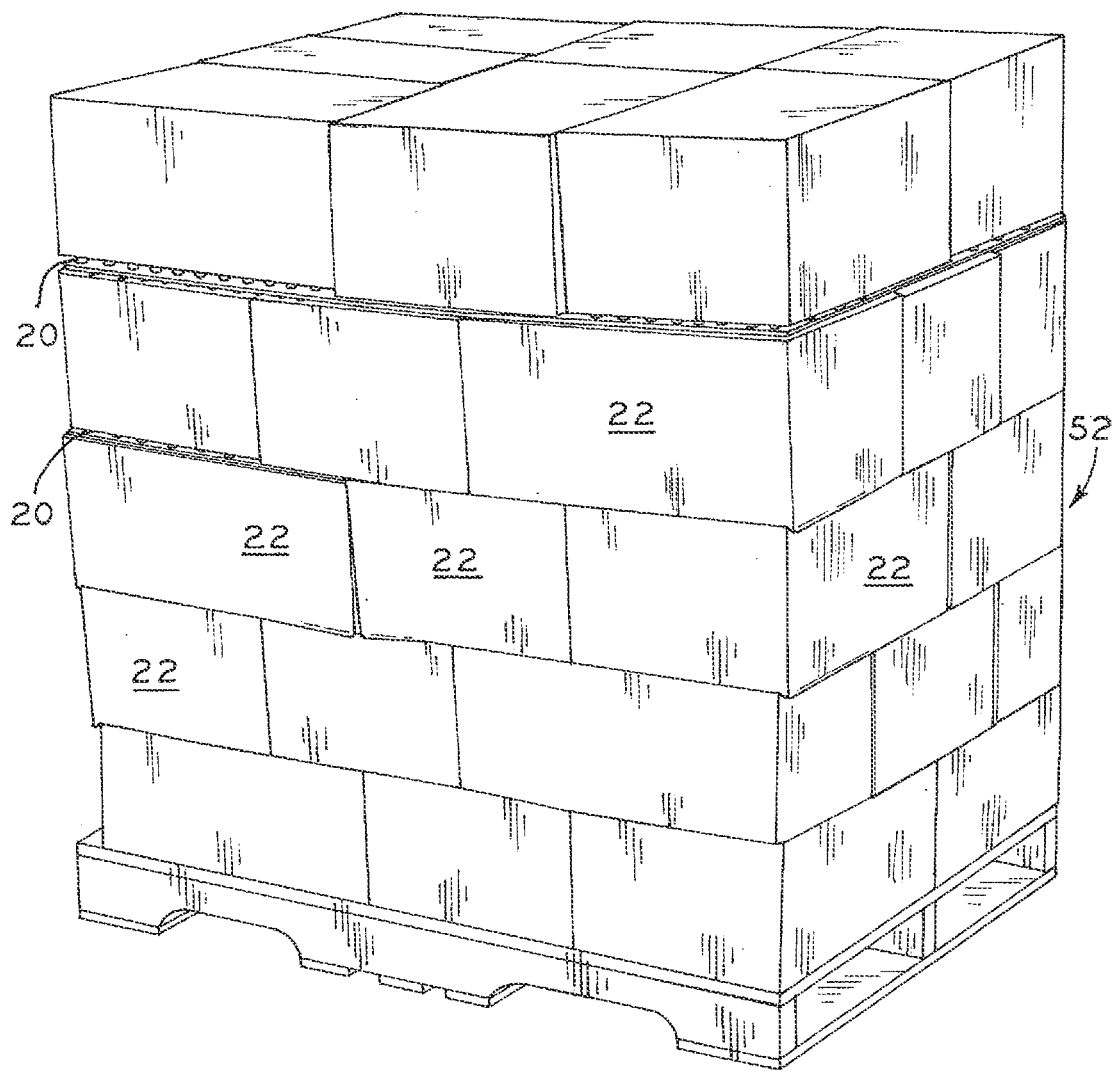
FIG. 7 is a perspective view of a pallet assembly incorporating a predicate spacer.
Figure 8:
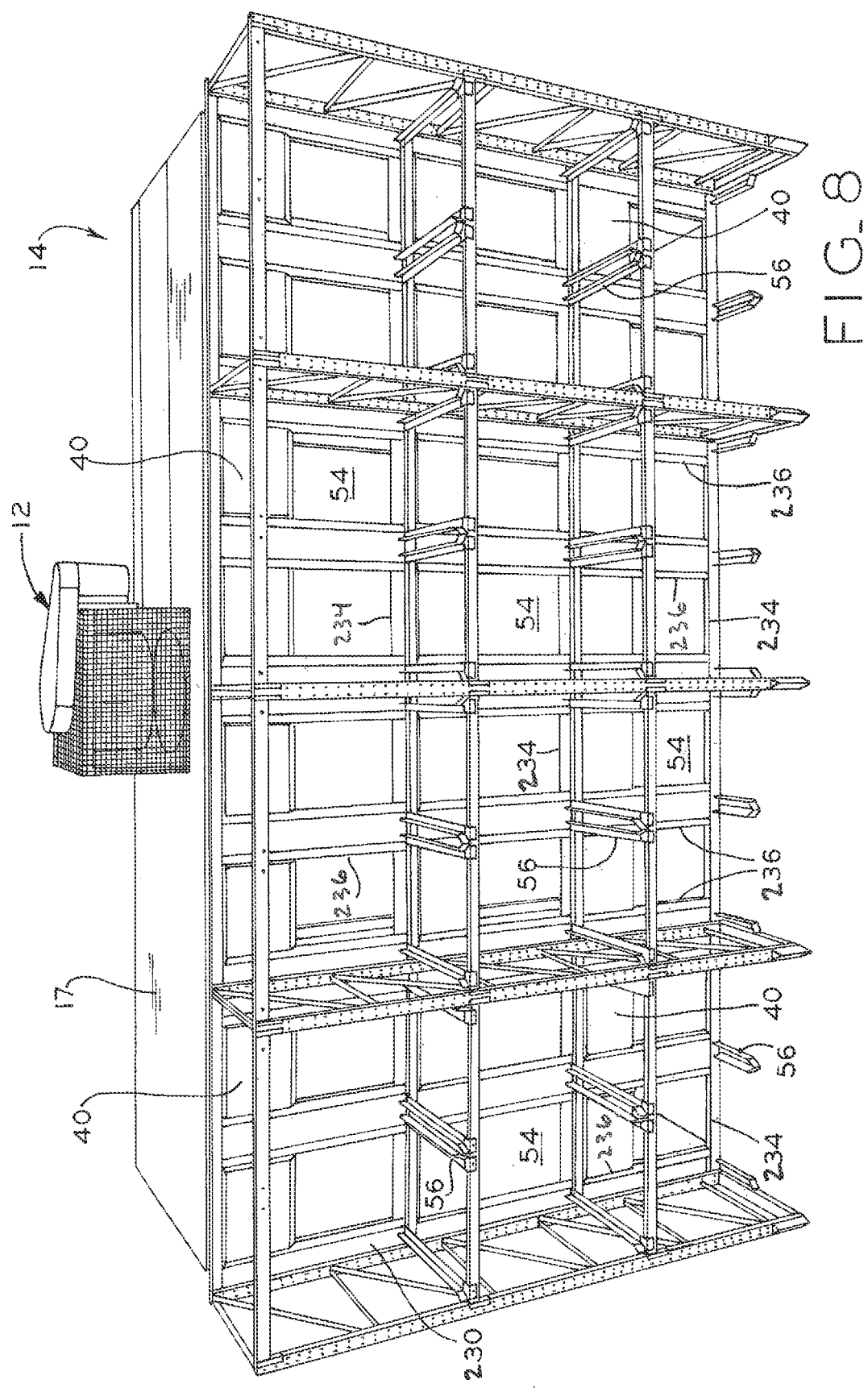
FIG. 8 is a perspective view of a portion of a racking structure accommodating 24 pallet assembly receiving spaces on each side thereof.

As illustrated in, e.g., FIG. 9, spacers 30 may have longitudinal airflow channels 38 formed therethrough. Airflow channels 38 facilitate a generally longitudinal, directional flow of air through the spacer from an input at one side of the palletized product assembly 52 to an output at an opposite side. Further discussion of exemplary longitudinal channels and spacer arrangements can be found in U.S. Patent Application Publication No. 2014/0273793, filed Jan. 28, 2014 and entitled HEAT TRANSFER SYSTEM FOR WAREHOUSED GOODS, and in U.S. Patent Application Publication No. 2014/0273801, filed Mar. 15, 2013 and entitled SPACER FOR A WAREHOUSE RACK-AISLE HEAT TRANSFER SYSTEM, the entire disclosures of which are hereby explicitly incorporated herein by reference. Although spacers 30 provide enhanced airflow and heat transfer performance characteristics as compared to predicate spacers 20 (FIGS. 5-7) and are used in an exemplary embodiment of pallet assembly 52, it is contemplated that predicate spacers 20 may also be used in pallet assembly 52, as required or desired for a particular application.

2. Individualized Air Handlers for Designated Pallet Bays

Figure 10:
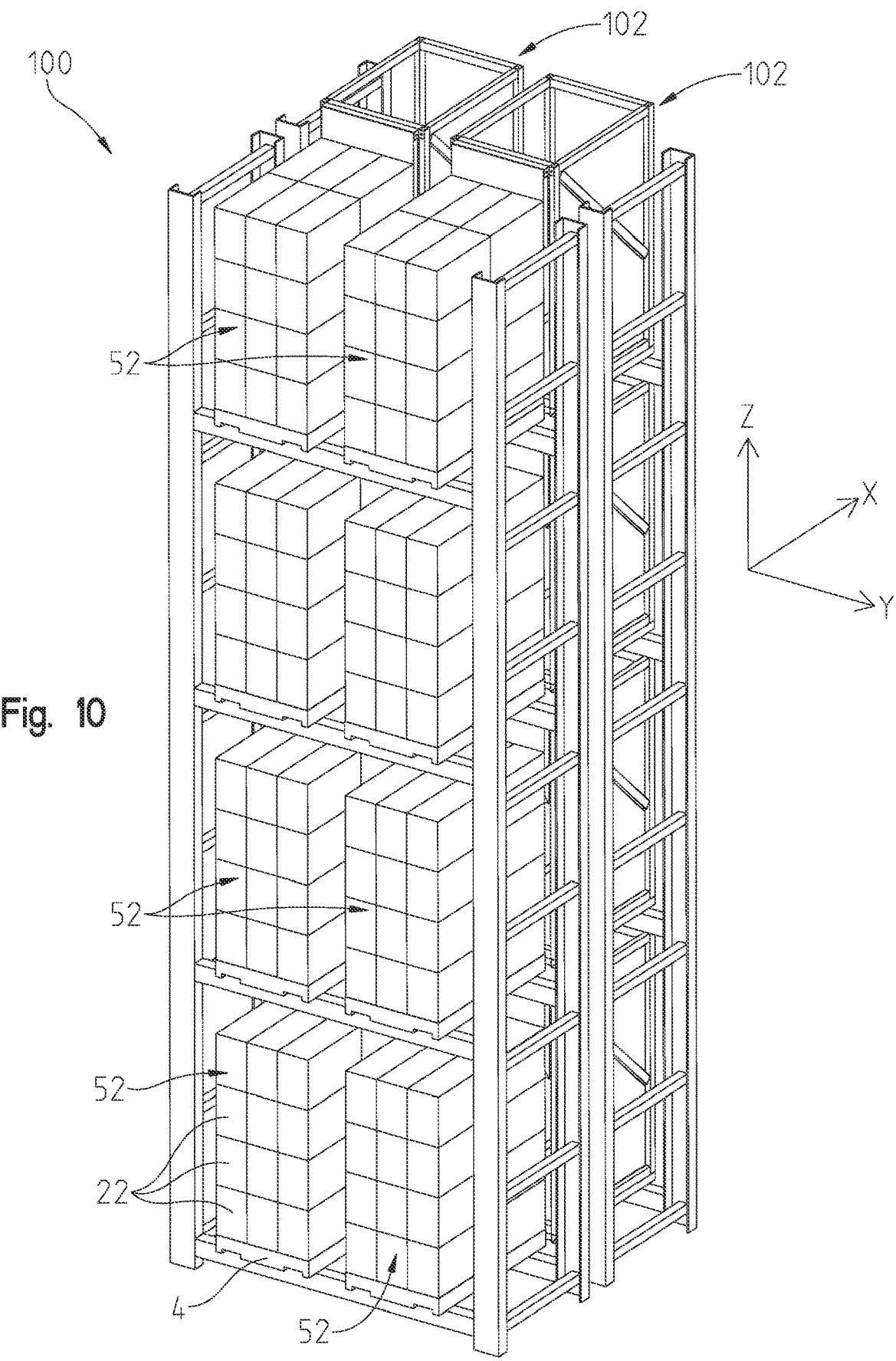
FIG. 10 is a perspective view of a rack assembly in accordance with the present disclosure, in which air handler assemblies are positioned in rearward bays and palletized product assemblies are positioned in adjacent forward bays.
Figure 16A:
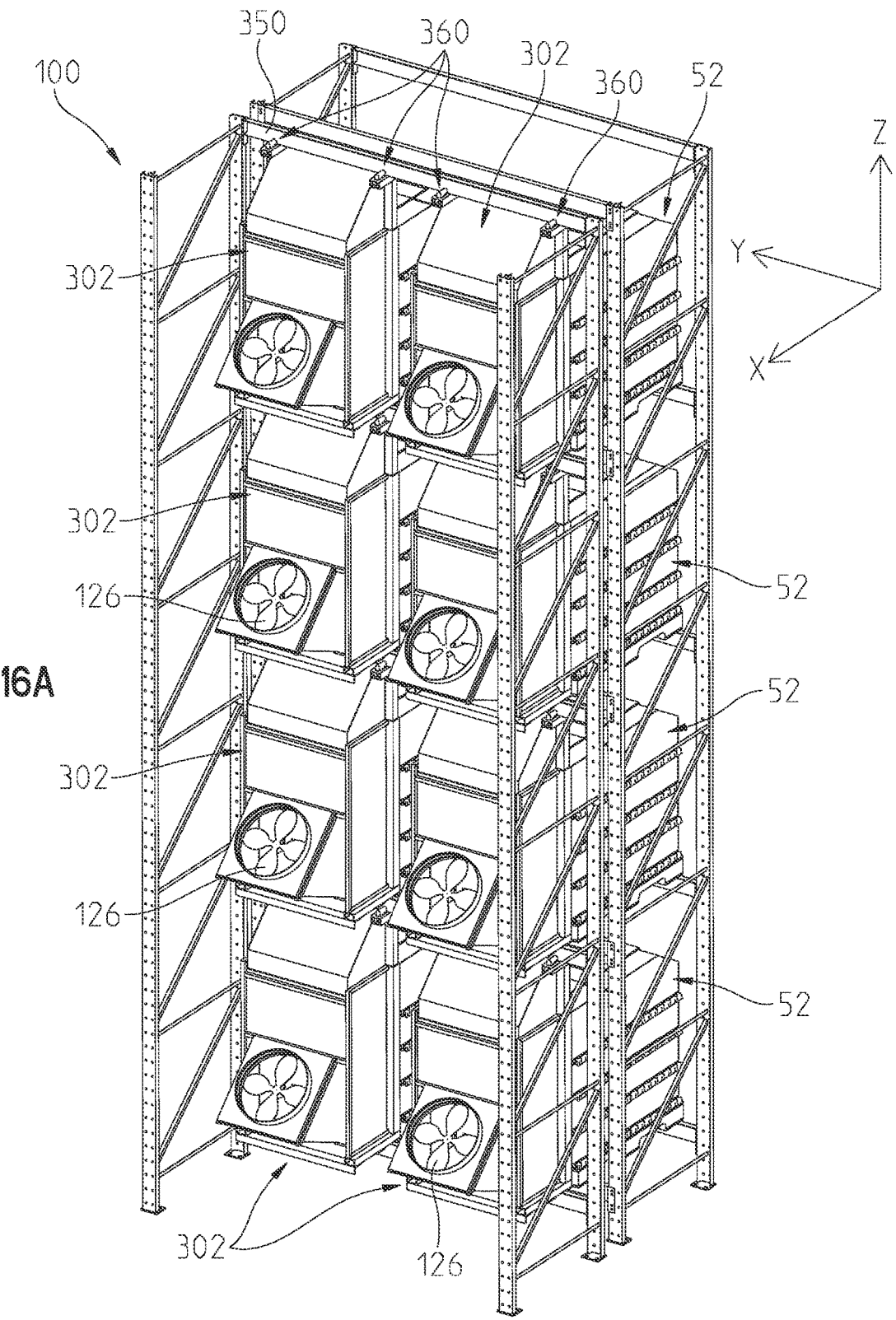
FIG. 16A is another perspective view of the rack assembly shown in FIG. 15, illustrating the air handler assemblies positioned in the rearward bays.

Turning to FIG. 10, rack 100 is illustrated with a two-column, four-row array of forward pallet bays, each of which is shown occupied by palletized product assemblies 52. A corresponding array of rearward pallet bays is shown occupied by air handler assemblies 102 (FIG. 11) and/or air handler assemblies 302 (FIG. 16A). In this regard, rack 100 can be considered a "2-deep" rack structure because it is amendable to receiving two pallets, one behind the other, along a loading/unloading or "X" direction as shown. As described in detail below, rack 100 may be a commercially available rack configuration combined with air handler assemblies 102 and/or 302 to modularly and selectively induce airflow through one or more palletized product assemblies 52 for any individual pallet bay or combination of pallet bays.

In an exemplary embodiment, rack 100 may be used in warehouse 2, shown in FIG. 2, in place of the single deep rack 14 shown in, e.g., FIGS. 3 and 4. For example, two sets of racking 100 may be placed "back to back," with or without air chamber 6 formed therebetween (FIG. 4). An aisle 10 (FIG. 3) accesses the forward bays on both sides of the back-to-back racking structure, such that forklift 18 can access the pallet bays of each rack 100 from respective aisles 10. The back-to-back arrangement, and the use of air chamber 6, is not required for rack 100 when used in conjunction with air handler assemblies 102, 302, because air handler assemblies 102, 302 can induce the required airflow through each individual pallet bay without the use of the sealed plenum and centralized exhaust fans 12 shown in FIG. 4. Thus, in some applications, rack 100 may be used in a free standing configuration within warehouse 2.

Moreover, air handler assemblies 102, 302 may be used with respective palletized product assemblies 52 independent of rack 100. For example, air handler assembly 102, 302 may placed free-standing within a warehouse or other conditioned environment, and palletized product assembly may then be engaged with first airflow aperture 136 and swing seal 40 as described herein. Fan or air handler 126 may then be activated (e.g., by controller 130 as described below) to induce an air flow through and around palletized product assembly 52, thereby inducing heat transfer between the goods contained within cases 22 and the ambient air. Additional air handler assemblies 102, 302 may be placed throughout the conditioned environment and used to effect heat transfer for additional palletized product assemblies 52 in a similar fashion, scaled according to the needs of the application.

For purposes of the present discussion, rack 100, air handler assemblies 102 and 302, and other associated structures will be discussed in the context of a Cartesian coordinate system shown in each of FIGS. 10 through 14. In use, rack 100 is typically placed on a level surface within warehouse 2 such that palletized product assemblies 52 and air handler assemblies 102, 302 sit generally upright and level within respective pallet bays of rack 100. In this context, an "upright" orientation refers to a generally vertical orientation along the Z axis shown FIGS. 10 through 14. A "horizontal" or "level" orientation refers to an orientation along the X and/or Y directions. As illustrated, e.g., in FIG. 10, the Y direction will be considered as a lateral or "left-right" direction from the perspective of an operator facing the array of pallet bays of rack 100, e.g., from aisle 10 (FIGS. 2 and 3). The X direction is a depth or "front-to-back" direction, with the "front" or forward portion of rack 100 being the portion closest to the operator, while the "back" or rearward portion is the portion furthest from the operator.

Notwithstanding the foregoing, spatial terms such as "forward," "rearward," "upright," "vertical," "horizontal" and "level" are used for convenience and to establish relative positions, locations, and configurations with respect to other structures and a typical system user. Such terms are to be understood in this relative context and are not to be taken as absolute. For example, a structure which is "upright" in typical use is considered to be generally perpendicular to a "horizontal" structure, but such as "upright" structure need not necessarily be vertical with respect to gravity at all times. Stated another way, an "upright" structure can still be referred to as "upright" within the context of the present disclosure even if the structure is laid on its side. Similarly, a "forward" structure may still be referred to as such even if the perspective shifts (e.g., if an operator faces the structure from the opposite side).

In the illustrative embodiment of FIG. 10, each pallet bay is shown to define a width, height, and depth sized to receive a standard pallet 4 with cases 22 stacked thereupon to a standard height. For example, the pallet bays of rack 100 may be sized to accommodate a pallet 4 that is rectangular in shape and measures about 40 inches by about 48 inches, as noted above, with a plurality of cases 22 stacked thereupon up to a height of about 96 inches. In order to use standard, commercially available 2-deep racking 100, air handler assembly 102, 302 may occupy a footprint similar to or smaller than a standard-size pallet 4, i.e., 40 inches by 48 inches, and may have a height not exceeding a standard height for palletized product assembly 52, i.e., 96 inches. Thus, the depth along the X direction of rack 100 is sufficient to accommodate a combination of air handler assembly 102, 302 in the rearward bay and palletized product assembly 52 in the forward bay, or may accommodate two palletized product assemblies 52. Similarly, a combination of two air handler assemblies 102 and/or 302 in the forward and rearward bays is possible, such as for storage.

Figure 12:
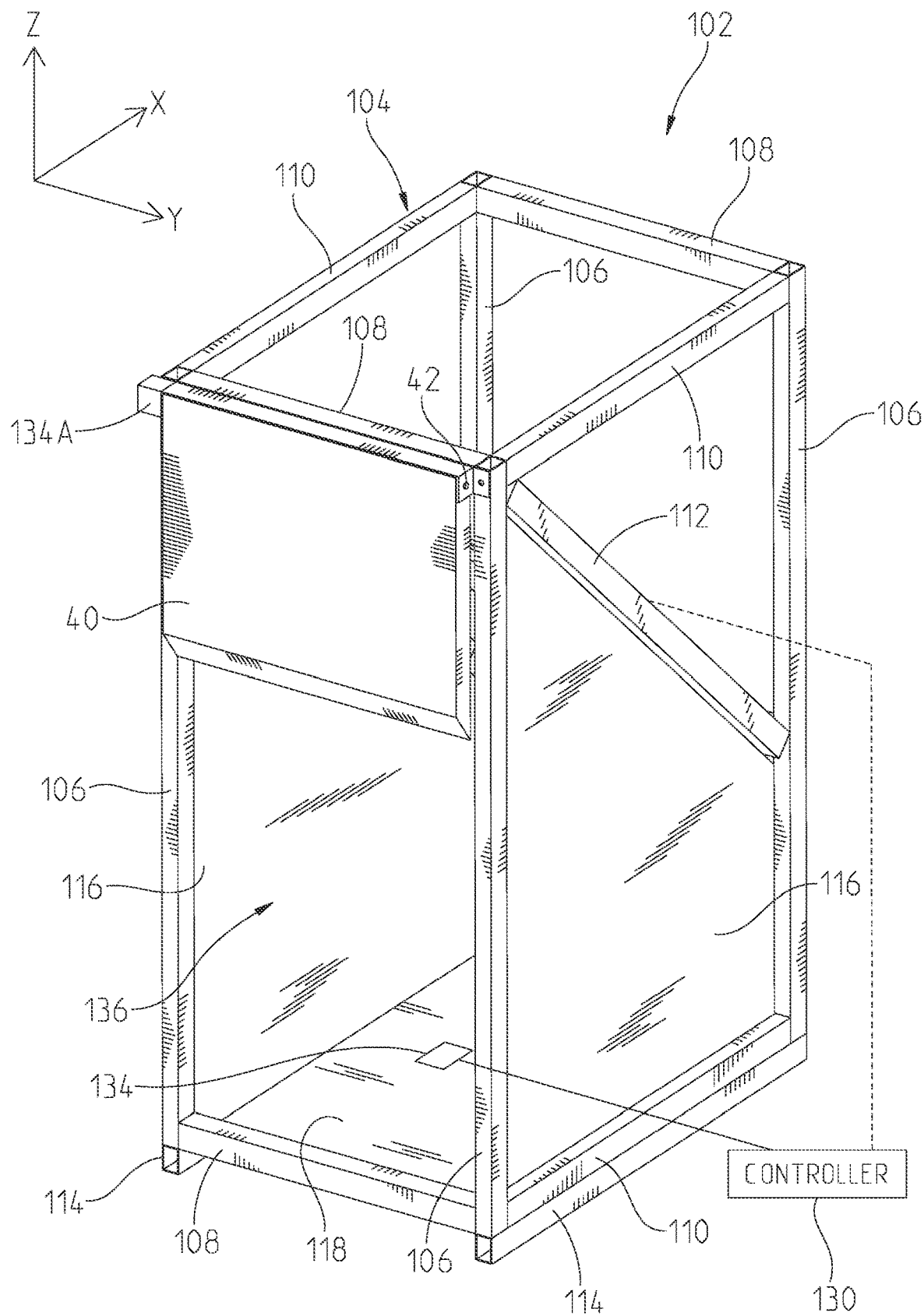
FIG. 12 is a perspective view of an air handler assembly made in accordance with the present disclosure.
Figure 13:
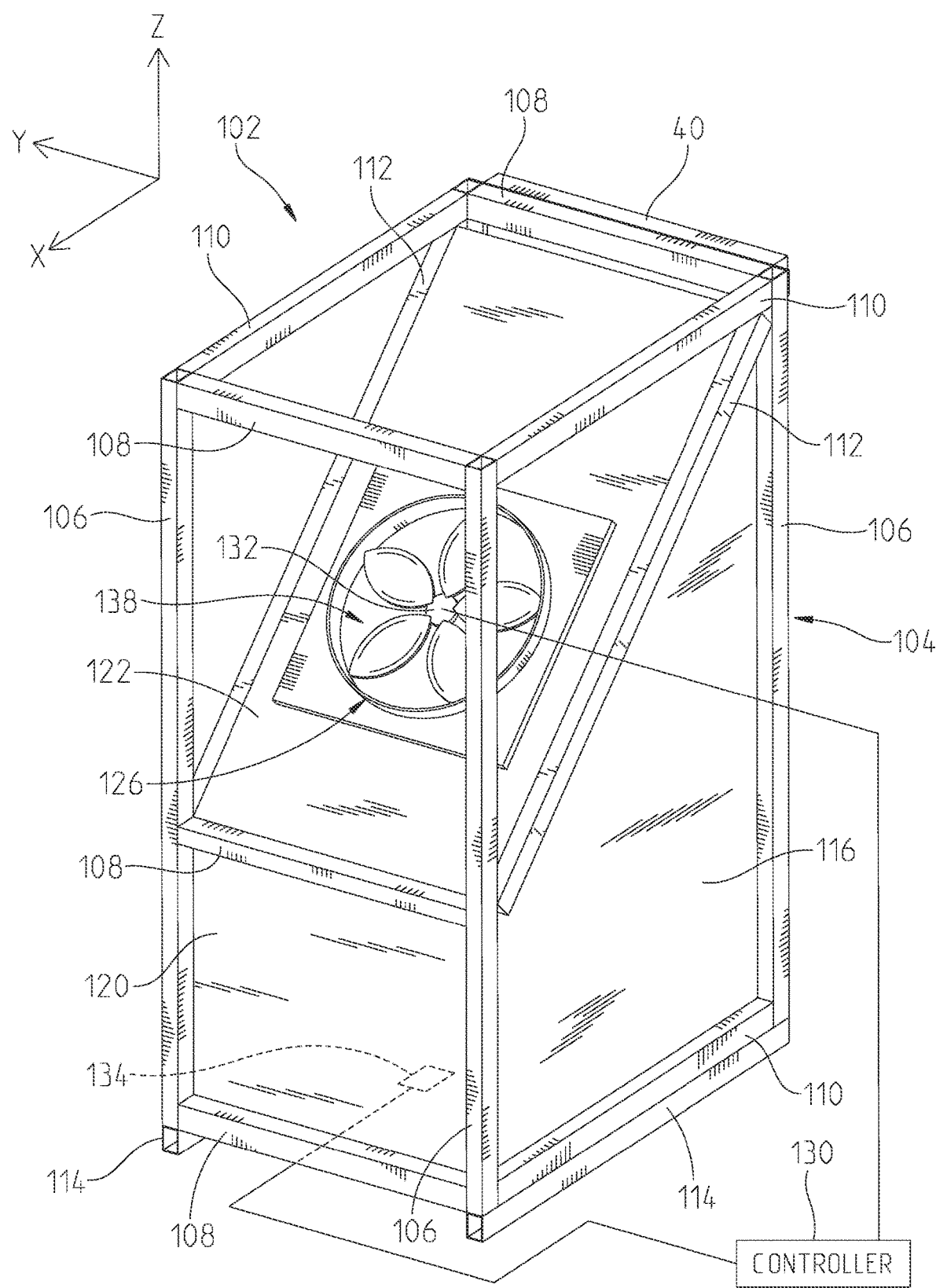
FIG. 13 is another perspective view of the air handler assembly shown in FIG. 12.
Figure 14:
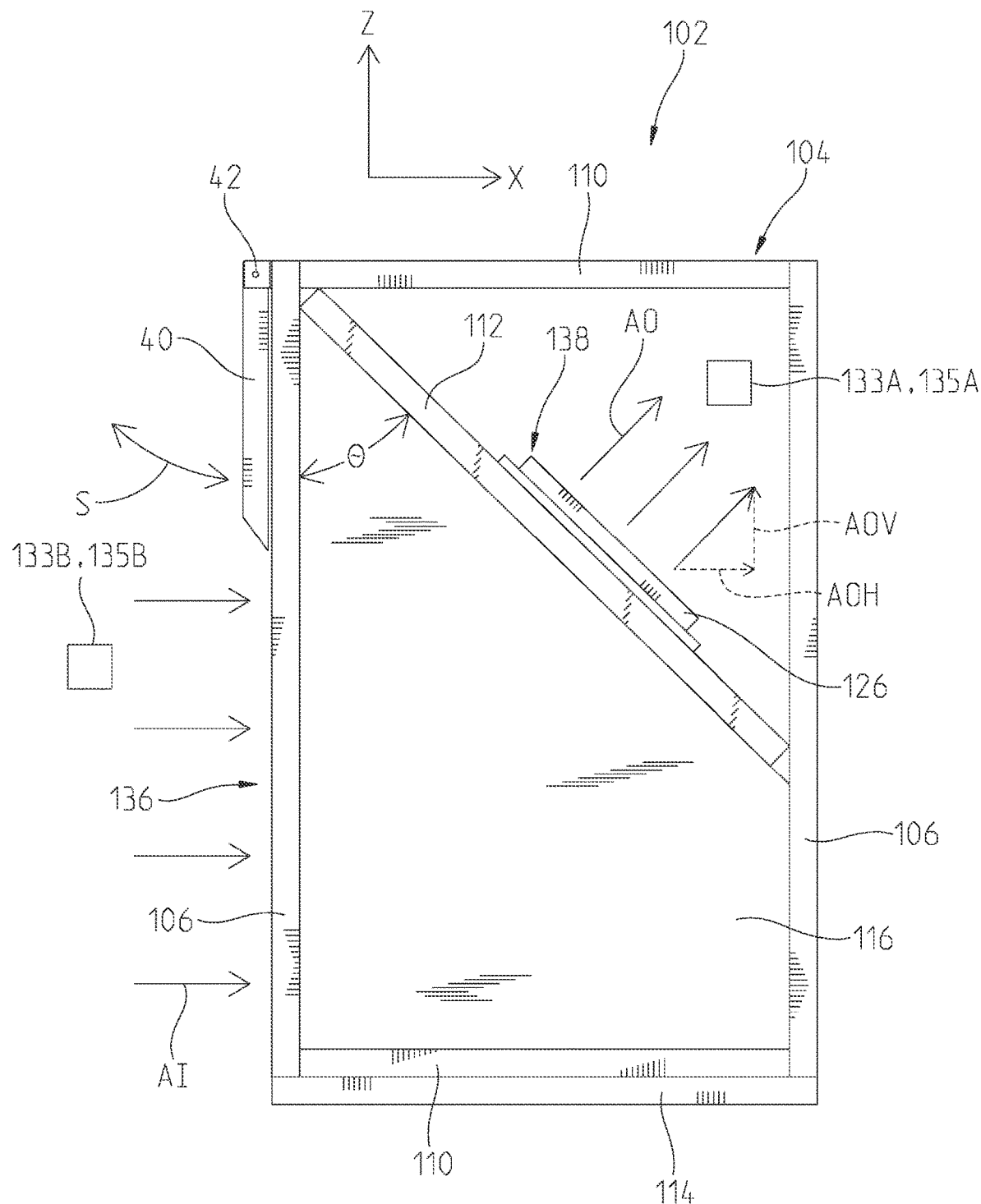
FIG. 14 is a side elevation view of the air handler assembly shown in FIG. 12, illustrating an exemplary airflow pattern therethrough.

Turning now to FIGS. 12 and 13, air handler assembly 102 is illustrated in detail from forward and rearward perspectives, respectively. Assembly 102 includes frame 104 with a plurality of enclosure panels 116, 118, 120, 122 which, taken together, create an enclosure having an airflow pathway extending between first airflow aperture 136 (illustratively, a front, intake opening as shown in FIGS. 12 and 14) and second airflow aperture 138 (illustratively, a discharge opening including fan 126, as shown in FIGS. 13 and 14). In an exemplary embodiment, the enclosure formed by enclosure panels 116, 118, 120, 122 is substantially sealed except for airflow apertures 136 and 138. As further described below, the airflow pathway through the enclosure facilitates a forced airflow through palletized product assembly 52 by operation of air handler 126 (FIG. 13).

Air handler assembly 102 includes frame 104, which includes upright frame members 106, laterally extending frame members 108 and front-to-back frame members 110. These frame members 106, 108 and 110 are joined together (e.g., by welding or mechanical fastening) to form a rectangular cuboid shape as best seen in FIGS. 12 and 13. This cuboid configuration allows multiple air handler assemblies 102 to be efficiently stacked upon and next to one another in, e.g., a storage space or transport truck. In an exemplary embodiment, base support members 114 are provided along a front-to-back direction at the left and right sides of frame 104, and are sized to allow the forks of forklift 18 underneath frame members 108 and base enclosure panel 118 (FIG. 12). This facilitates the retrieval, movement and placement of air handler assemblies 102 via forklift 18.

Frame 104 further includes angled frame members 112 which extend downwardly and rearwardly from the topmost and forward frame member 108, as best shown in FIG. 13. Frame members 112 provide support surfaces for the fixation of angled rear enclosure panel 122 to frame 104. Similarly, side enclosure panels 116 are supported by and fixed to respective front-to-back frame members 110, upright frame members 106, and angled frame members 112. A generally upright rear enclosure panel 120, disposed beneath the angled rear panel 122, is fixed to and supported by a pair of laterally extending frame members 108 and a pair of upright frame members 106, as shown if FIG. 13. Finally, a generally horizontal base enclosure panel 118 is fixed to and supported by two lower laterally extending frame members 108 and the left and right front-to-back frame members 110 as best shown in FIG. 12. In an exemplary embodiment, the components of frame 104, the enclosure panels 116, 120, 122, and the other components of air handler assembly 102 may be made of galvanized steel, stainless steel, powder coated steel or similar materials suitable for use in the food or human-consumable industries. Fan 126 and other components may be rated for washdown duty, as required or desired for a particular application.

Figure 11:
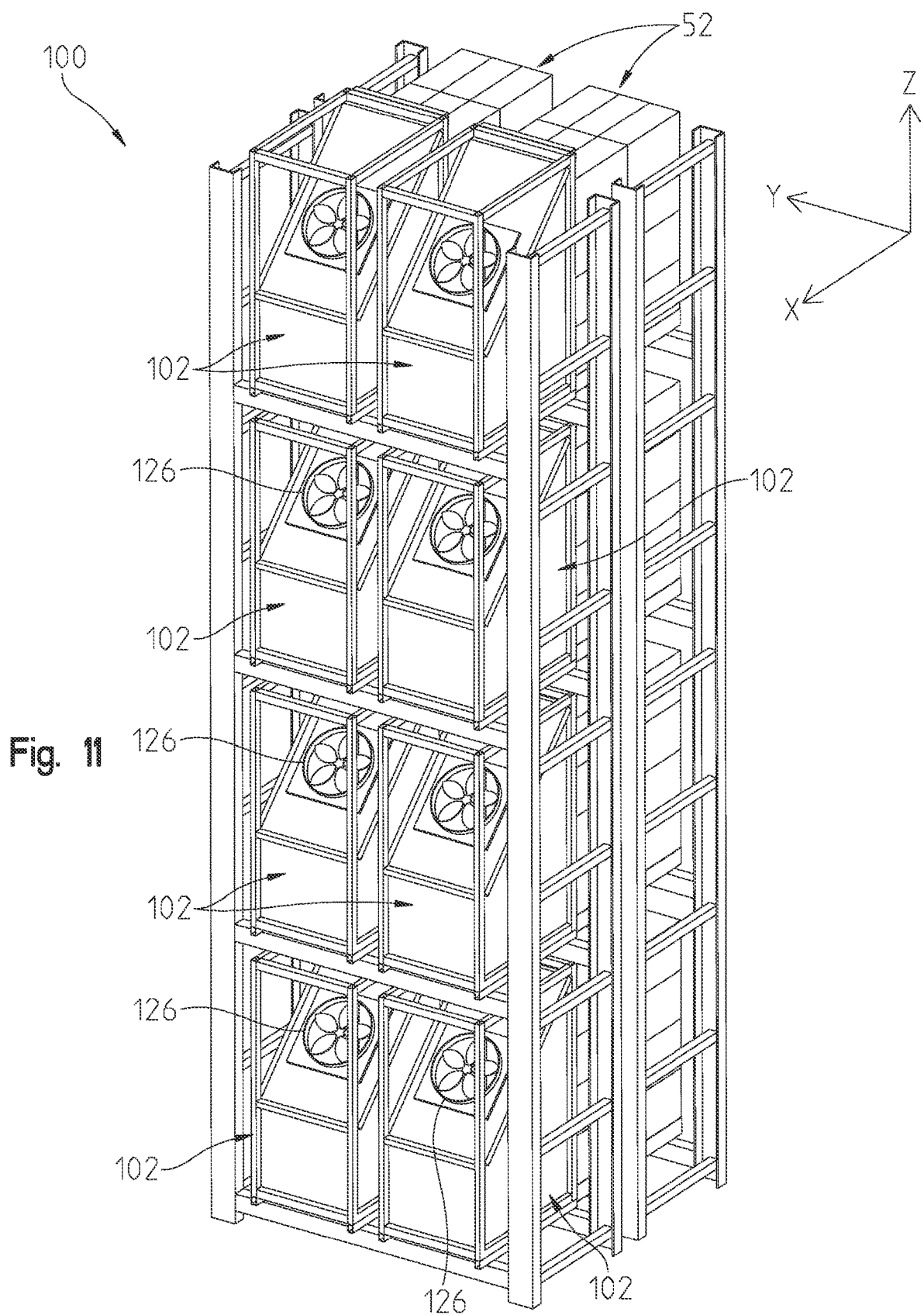
FIG. 11 is another perspective view of the rack assembly shown in FIG. 10, illustrating the air handler assemblies positioned in the rearward bays.

Together, side enclosure panels 116, base enclosure panel 118 and angled rear enclosure panel 122 cooperate to bound first airflow aperture 136 in conjunction with the adjacent frame members. As illustrated in FIGS. 12 and 14, first airflow aperture 136 has a generally vertical and upright orientation which can sealingly engage a correspondingly vertical and upright surface of palletized product assembly 52. In particular, palletized product assembly 52 is sized to substantially or completely block airflow aperture 136 when positioned adjacent to or abutting air handler assembly 102, as is the case when palletized product assembly 52 occupies a forward bay of rack 100 and air handler assembly 102 occupies the adjacent rearward bay (FIGS. 10 and 11).

Second airflow aperture 138 is formed on the angled surface of the enclosure defined by angled rear enclosure panel 122, as illustrated in FIGS. 13 and 14. In particular, this surface has an angled orientation relative to the horizontal and upright directions, illustratively defining angle θ (FIG. 14) with respect to the vertical (i.e., "Z") direction. In an exemplary embodiment, angle θ is between 20 and 60 degrees, such as about 40 degrees.

In the illustrated embodiment, fan 126 is disposed within second airflow aperture 138 and creates an angled flow of outlet air AO (FIG. 14) which is substantially perpendicular to the angled planar surface of rear enclosure panel 122. This angled air flow directs outlet air upwardly and rearwardly from within the enclosure of air handler assembly 102, and into vacant space within frame 104 but outside the enclosure. This angled airflow profile allows outlet air to be directed rearwardly away from any structures stacked top of frame 104, such as another upper air handler assembly 102 as shown in FIG. 11. The flow is also directed upwardly away from any obstruction which may be behind frame 104. For example, in some arrangements two racks 100 may be positioned in a back-to-back arrangement with fans 126 of respective air handler assemblies 102 facing one another. By angling the flow upwardly, these two fans avoid detrimental competition with one another.

The angled airflow of outlet air AO provided by fan 126 has two vector components, namely, horizontal vector component AOH and vertical vector component AOV. The relative proportion of these vector components is controlled by angle θ, such that a reduction in angle θ increases the horizontal component AOH and decreases the vertical component AOV, and vice versa. Angle θ may be varied in order to vary the vector components AOH and AOV according to the needs of a particular application, such as the location of any structures which may impede airflow in the vicinity of air handler assembly 102, and other considerations as required or desired for a particular application.

In the illustrative embodiment of FIGS. 12 and 14, swing seal 40 is provided in an upper portion of first airflow aperture 136. Swing seal 40 is pivotally joined at pivot points 42 to an upper and forward end of frame 104, with a sealing surface that sits proud (i.e., forwardly) of aperture 136 as best seen in FIG. 14. Swing seal 40 is pivotable along a swing arc S (FIG. 14), and may be rearwardly pivoted into the enclosure of air handler assembly 102 when contacted by a pallet assembly 52 (see, e.g., FIG. 10). Swing seal 40 ensures that a low leakage top seal is made with pallet assembly 52 regardless of variability in pallet assembly height, thereby ensuring the substantial or complete blockage of aperture 136 by palletized product assembly 52. In particular, swing seal 40 pivots about a horizontal axis and substantially spans the space between adjacent upright frame members 106. Swing seal 40 is also spaced above base enclosure panel 118 leaving the remainder of aperture 136 exposed, while substantially blocking the remaining upper portion of aperture 136 as illustrated in FIG. 12. Further details of the construction, use and function of swing seal 40 may be found in U.S. Pat. No. 8,919,142, entitled "SWING SEAL FOR A RACK AISLE FREEZING AND CHILLING SYSTEM" and filed on Mar. 29, 2011, the entire disclosure of which is hereby explicitly incorporated by reference herein.

Alternatively, automatic louver-type pallet height compensation may be achieved through a plurality of louver blades placed at the opening (e.g., apertures 136 or 336) of the air handler assemblies 102, 302. The louver blades may be individually pivotable, such that the blades can be aligned or mis-aligned to selectively close off or permit airflow therethrough in the area above the pallet. When a pallet assembly 52 is placed in the pallet receiving space and the controller 130 senses occupancy, the fan (e.g., fan 126 or 336) is activated and the louvers above the pallet assembly 52 pivot shut to prevent airflow. This allows a pallet assembly 52 of any height to be placed in front of apertures 136 or 336, while airflow is allowed through the pallet assembly 52 but not in the area above topmost layer of cases 22 of the pallet assembly 52.

Additional sealing technologies may be employed in conjunction with air handler assembly 102 in order to minimize or eliminate air leakage around pallet assemblies 52, and instead drive maximum airflow through assemblies 52 via airflow pathways (e.g., through the airflow channels 38 of spacers 30 shown in FIG. 9). Examples of such sealing technologies, including brush seals which may be used along the left and right upright frame members 106 bounding first airflow aperture 136, are described in U.S. Patent Application Publication No. 2017/0086485, entitled "HEAT TRANSFER SYSTEM FOR WAREHOUSED GOODS" and filed Sep. 30, 2016, the entire disclosure of which hereby explicitly incorporated by reference herein.

In addition, inflatable seals or pliable membranes may be installed to improve seals of various types of packaged goods. These may provide additional sealing at top and/or sides and/or bottom of pallet assembly 52. Membranes may be inflated by discharge of fans 126, 326 or by other means.

As noted above, fan 126 serves as an air handler operable to drive air through palletized product assembly 52 via first airflow aperture 136 when the air handler is activated, such as by applying power to a fan motor 132 (FIG. 13). In the illustrative embodiment of FIG. 14, fan 126 is used to drive outlet air AO through second airflow aperture 138, while a corresponding flow of inlet air AI is drawn through first airflow aperture 136 (e.g., after passing through palletized product assembly 52). This configuration creates a vacuum or negative pressure within the enclosure formed by enclosure panels 116, 118, 120 and 122. Alternatively, fan 126 may be reversed to create a positive pressure within the enclosure, which would reverse the airflow and "push" air through palletized product assembly 52 rather than "pulling" air therethrough. Moreover, while fan 126 is one exemplary air handler compatible with air handler assembly 102, it is contemplated that other air handling technologies may be employed as required or desired for a particular application, such as blowers, ducted systems, and the like.

Turning now to FIGS. 15-25, an alternative air handler assembly 302 and its constituent components are illustrated. Except as described below, air handler assembly 302 is similar in structure and function to air assembly 102 described above, and reference numerals of assembly 302 are analogous to the reference numerals used in assembly 102, except with 200 added thereto. Elements of assembly 302 correspond to similar elements denoted by corresponding reference numerals of assembly 102, except as otherwise described herein. All systems and structures useable in conjunction with assembly 102 are also useable with assembly 302 except as otherwise described herein.

However, air handler assembly 302 includes a modified frame 304 which is both more compact and more adjustable as compared to frame 104 of air handler assembly 102, such that air handler assembly 302 provides enhanced flexibility of integration with rack assembly 100 (FIG. 15) as well as a compact and "nestable" configuration for storage and/or shipping which allows a greater number of units to be contained within a given space or volume, e.g., a shipping trailer, container, or warehouse storage space.

Figure 17:
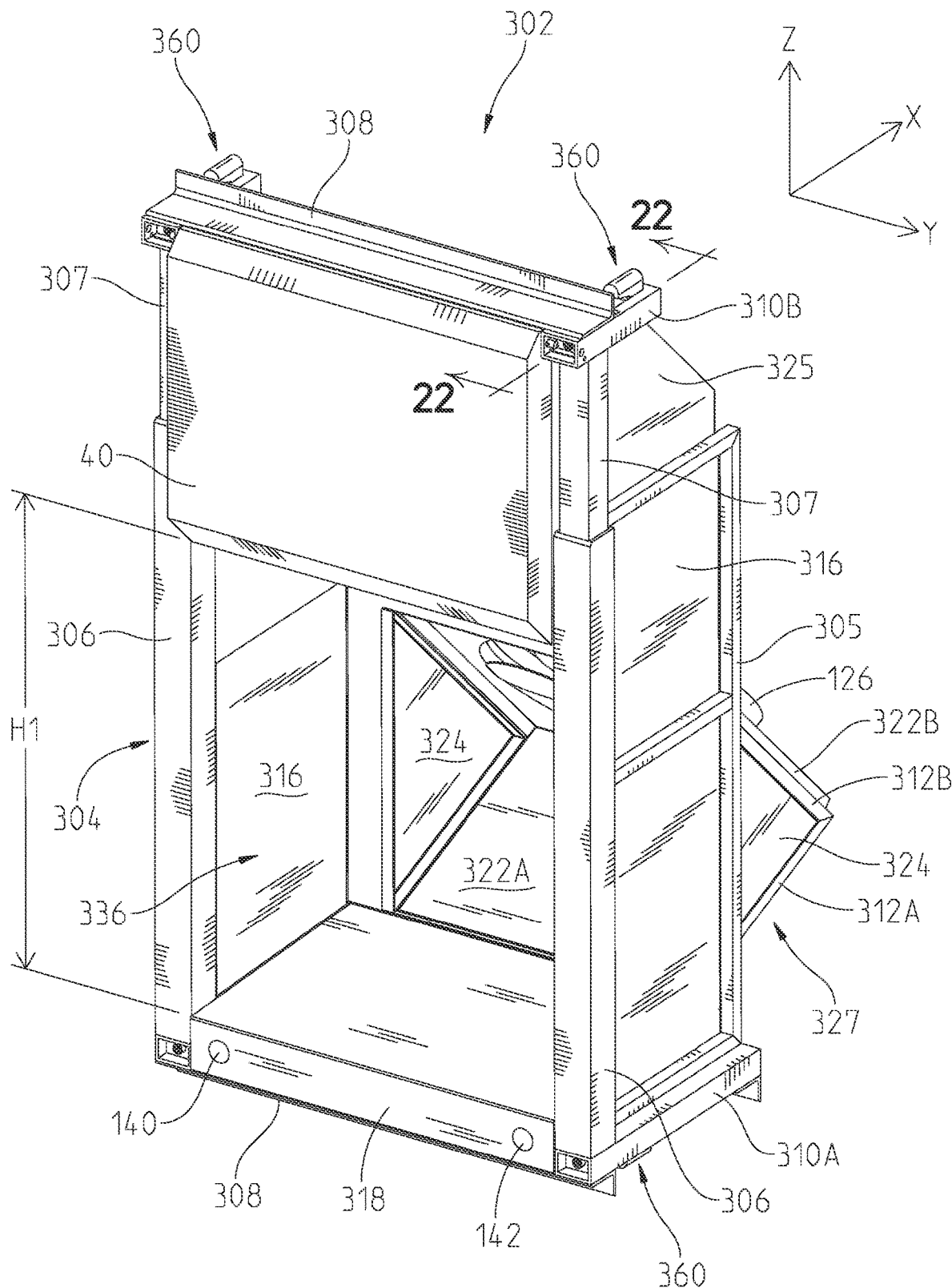
FIG. 17 is a perspective view of an air handler assembly made in accordance with the present disclosure, in which telescoping frame members are shown in a compact configuration.
Figure 22:
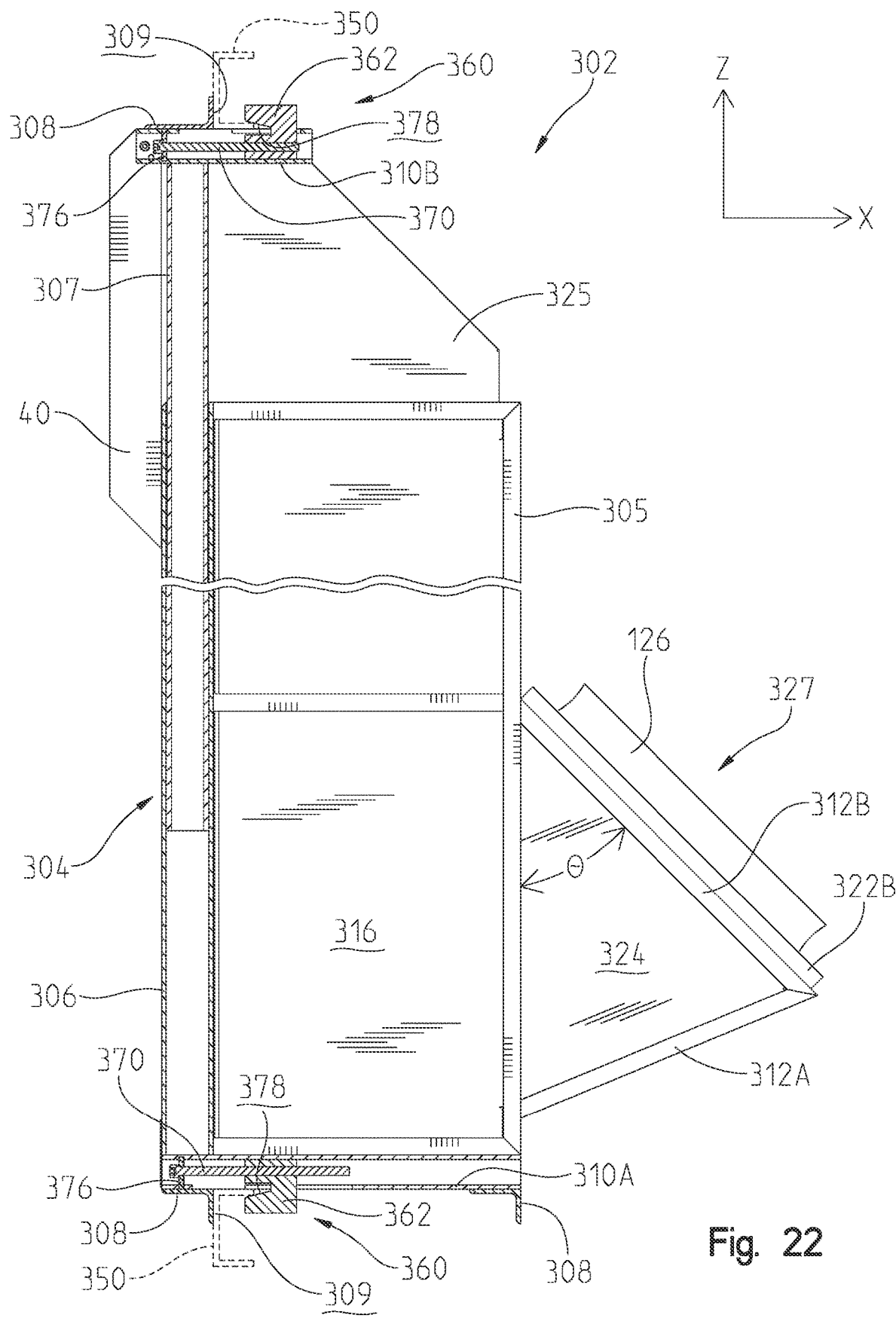
FIG. 22 is a side elevation, cross-section view of the air handler assembly taken along the line 22-22 of FIG. 17, illustrating an attaching mechanism made in accordance with the present disclosure.

As best seen in FIG. 17, air handler assembly 302 includes frame 304 having base frame members 306 with an upright (e.g., vertical) orientation and positioned to bound the left and right sides of upright airflow aperture 336, similar to upright frame members 106 of frame 104 (FIG. 12). Unlike frame 104, however, frame 304 provides upright frame sliders 307 which are slideably received within the hollow tubular opening defined by frame members 306 (FIG. 22). Thus, while upright frame members 306 form a portion of the base portion of frame 304, upright frame sliders 307 form a telescoping portion of frame 304 which is slideably and adjustably connected to the base frame portion. This slideable connection allows air handler assembly 302 to be modularly adjusted to connect to cross beams 350 in a tall pallet bay, as shown at the left portion of FIG. 26, or to more closely spaced cross beams 350 in a shorter pallet bay, as shown at the right side of FIG. 26.

Figure 19:
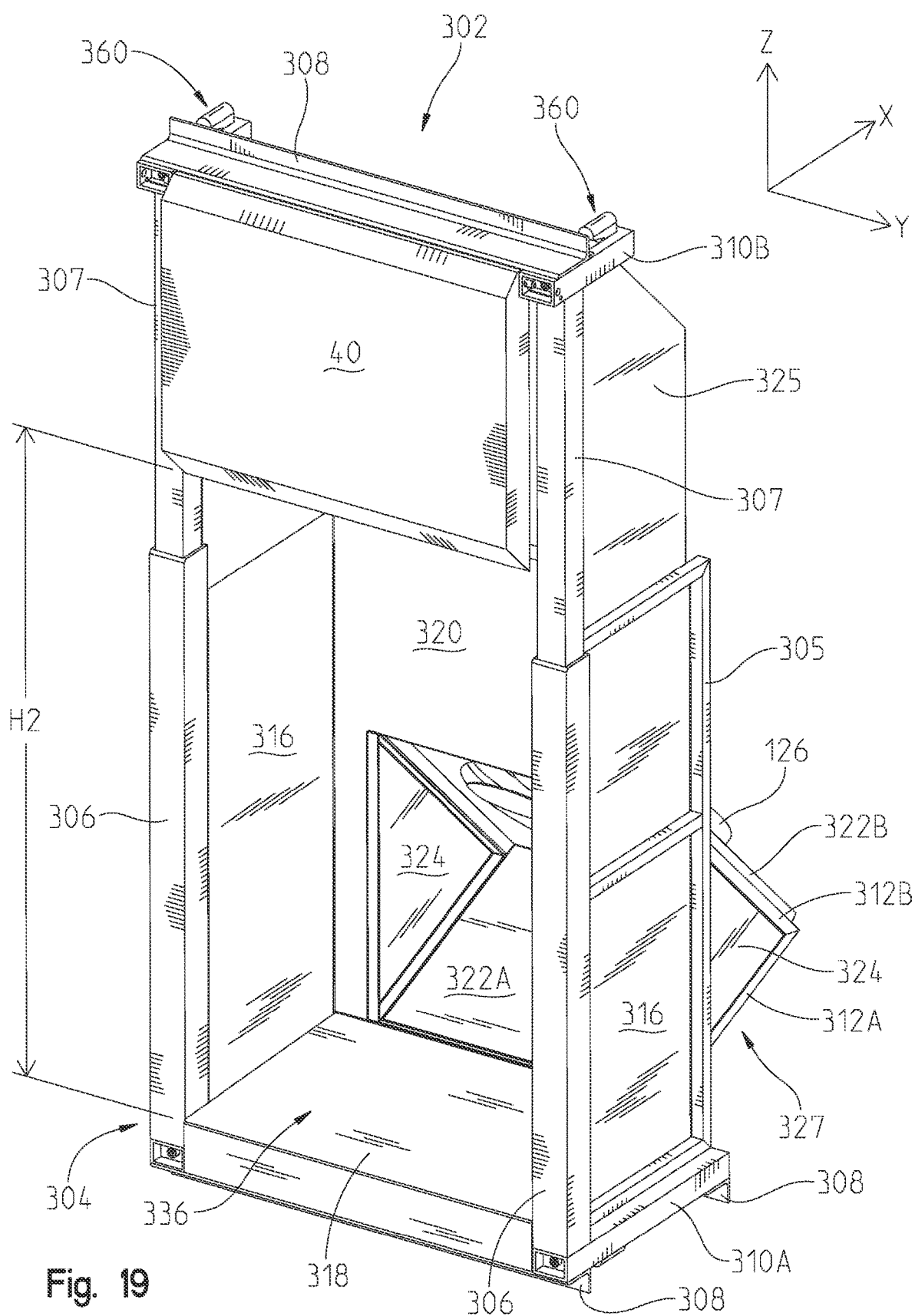
FIG. 19 is another perspective view of the air handler assembly shown in FIG. 17, in which the telescoping frame members have been reconfigured from the compact position to an extended position.

Referring still to FIG. 17, swing seal 40 is mounted to the telescoping frame portion of frame 304 via front-to-back frame members 310B (FIGS. 17 and 19) fixed to upright frame sliders 307. Therefore, adjustment of the telescoping frame portion also adjusts the height of airflow aperture 336 as shown by a comparison of FIGS. 17 and 19, illustrating a lower height H1 and a taller height H2 respectively. This automatically accommodates differences in the height of pallet assembly 52 that are expected with differences in the height of the bay to which air handler assembly 302 is installed, as further described below. Set screws may be provided in uprights 306 and may be tightened after the height adjustment is complete to fix the sliding uprights 307 at the desired vertical position.

Figure 15:
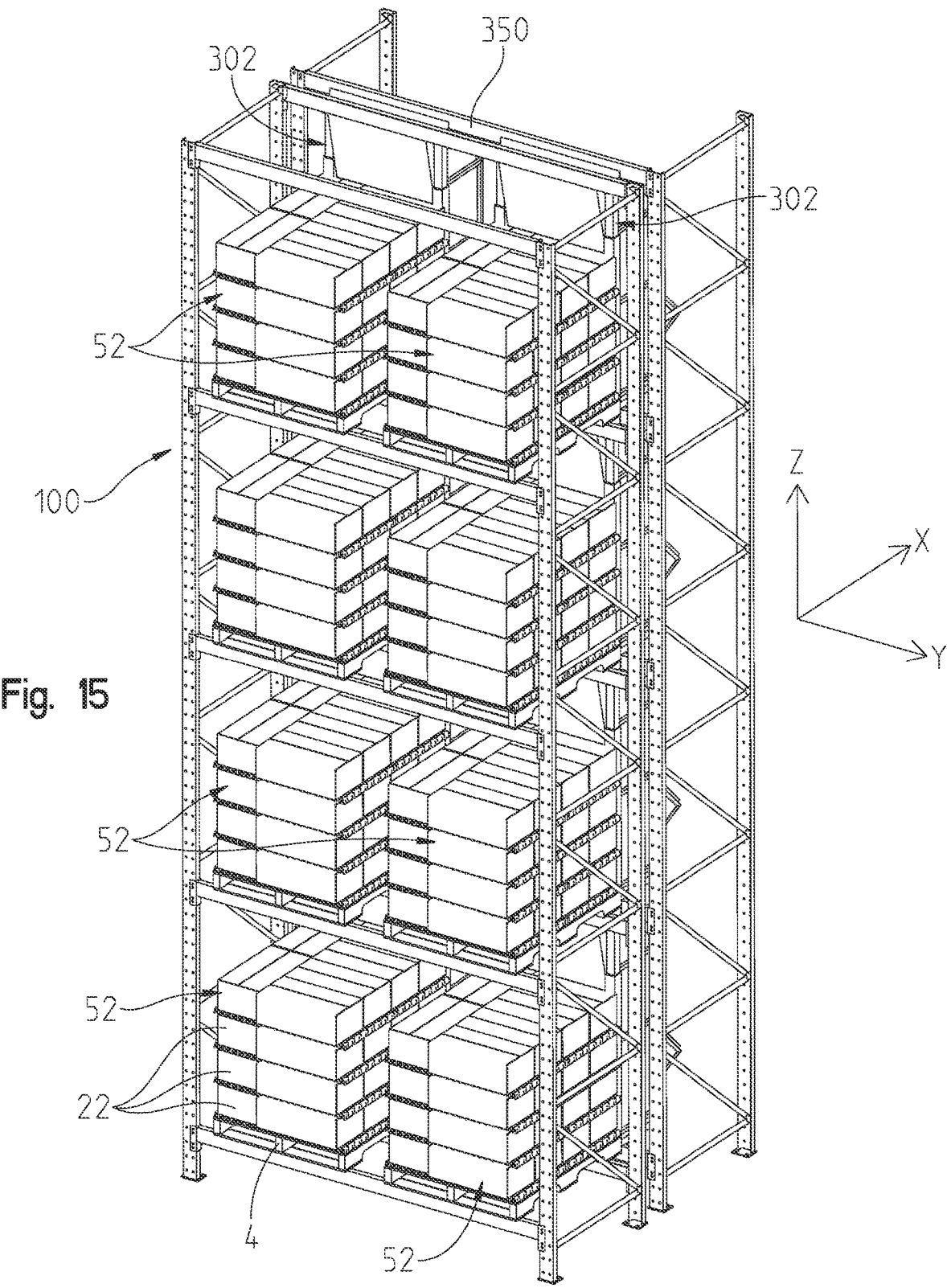
FIG. 15 is a perspective view of another rack assembly in accordance with the present disclosure, in which air handler assemblies are positioned in rearward bays and palletized product assembly are positioned in adjacent forward bays.
Figure 26:
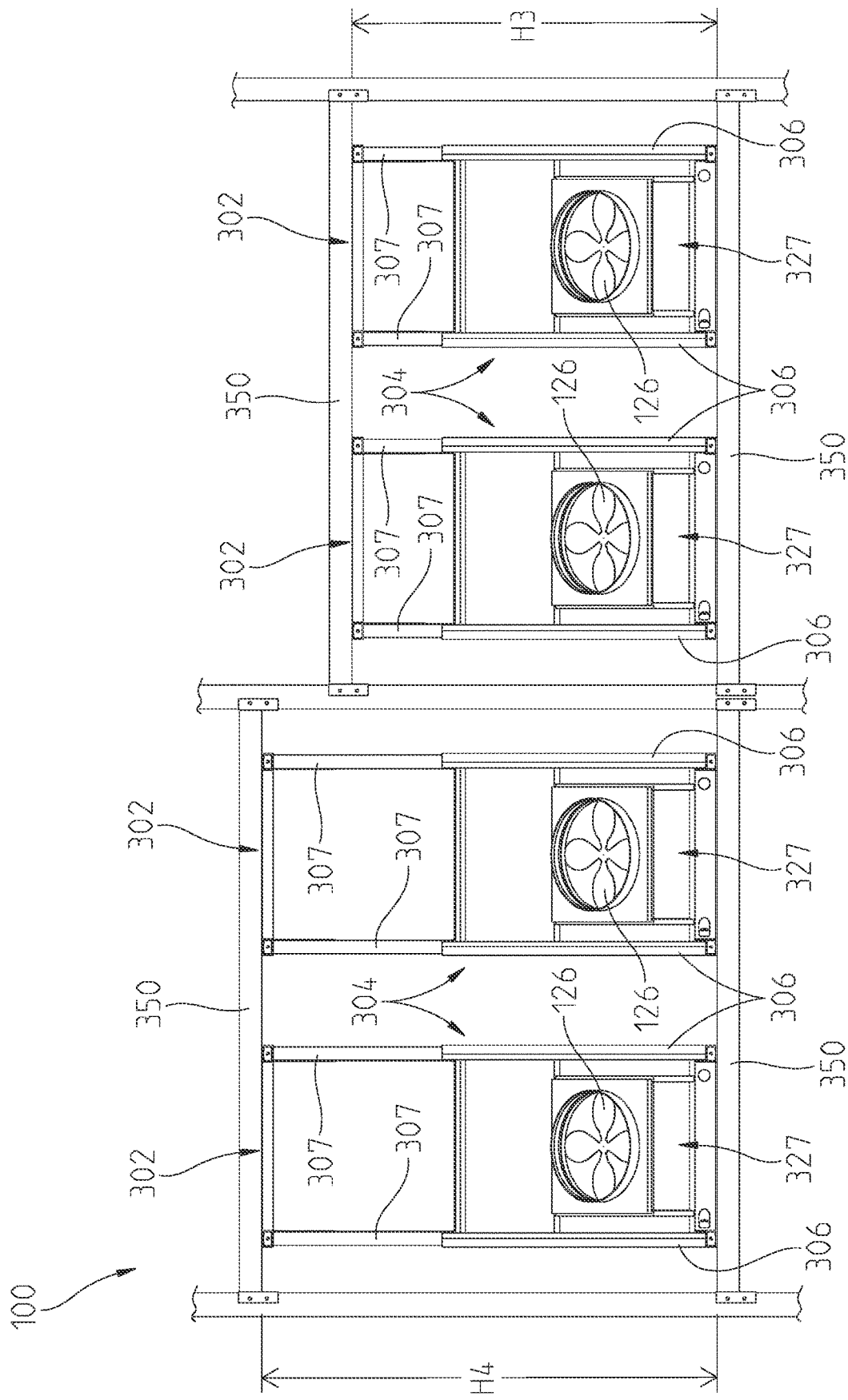
FIG. 26 is a perspective view of two pairs of the air handler assemblies of FIG. 17, in which a first pair of the assemblies have telescoping members in extended positions to attach to a tall rack, while a second pair of the assemblies have telescoping members in compact positions to attach to a short rack.

In one example, a portion of racking 100 shown in FIG. 26 may be adjusted to create tall pallet bays having a bay height H4 designed to accommodate proportionally tall pallet assemblies 52 (FIG. 15). Air handler assembly 302 is installed to this tall pallet bay by adjusting the telescoping portion of its frame 304 to attach its upper frame members 308, 310B to the upper cross beam 350 of the pallet bay and thereby accommodate the tall pallet bay. This adjustment also creates a relatively tall airflow aperture 336 having a height H2 (FIG. 19), which ensures that the upper edge of the top row of cases 22 engages swing seal 40. This creates a tight seal for air flow, while also ensuring airflow through and among the cases 22 of the tall pallet assembly 52.

Conversely, for a shorter pallet assembly 52, upright frame sliders 307 are adjusted to create a height H1 of opening 336, as shown in FIG. 17, which is lower than height H2 (FIG. 19). The telescoping frame can then be connected to cross beam 350 bounding the upper portion of the shorter pallet bay having height H3 (FIG. 26). This lowered configuration of the telescoping portion of frame 304 also lowers swing seal 40 to create a shorter airflow opening 336 having height H1, as shown in FIG. 17, such that swing seal 40 can still engage the upper edge of a relatively shorter pallet assembly 52 and thereby provide a good seal with airflow through and among the cases 22 of the short pallet assembly 52.

The enclosure provided by air handler assembly 302 is similar in overall structure and function as compared to the enclosure of air handler assembly 102, providing for a substantially airtight seal around frame 304 except for the upright airflow opening 336 (which may be an intake or exhaust) and the angled airflow opening 336 (which is used for the opposite function as opening 336). However, in the enclosure of air handler assembly 302, provision is made for the above-described adjustable height of frame 304, as well as being modified for compactness and nestability of multiple assemblies 302, as further described below.

Figure 18:
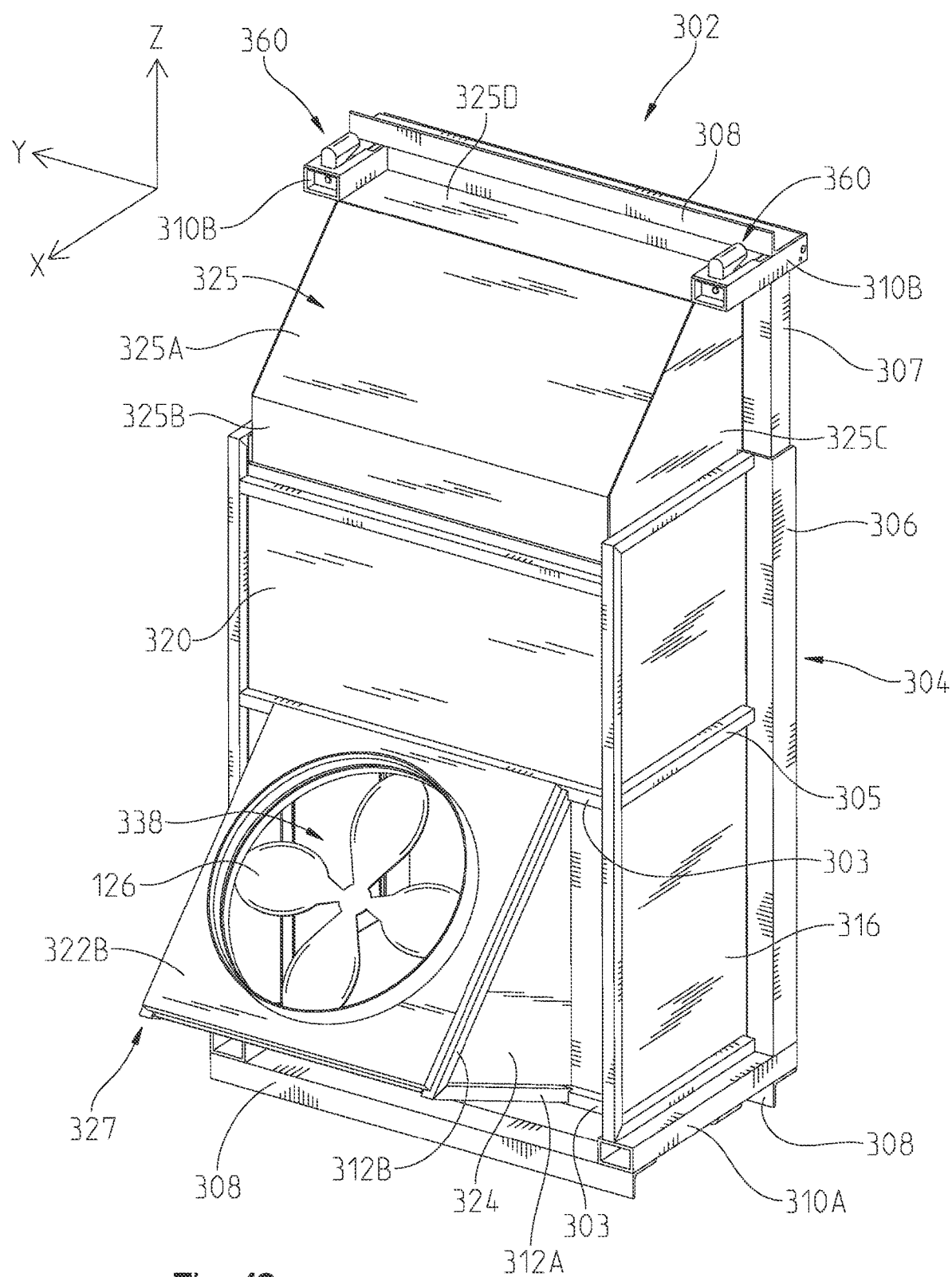
FIG. 18 is another perspective view of the air handler assembly shown in FIG. 17.

Turning now to FIGS. 17 and 18, frame 304 includes a pair of subframes 305 attached (e.g., by welding) to respective upright frame members 306. Subframes 305 generally extend along a front-to-back and top-to-bottom direction, i.e., in an XZ plane in the context of the Cartesian coordinate system provided in the figures. Subframes 305 each provide a mounting surface for side enclosure panels 316, which are fixed to respective subframes by, e.g., fasteners, welding or adhesives. Base enclosure panel 318 is oriented substantially horizontally and forms a junction with side enclosure panels 316 to enclose the bottom surface of airflow aperture 336. Rear enclosure panel 320 is also fixed to base frames 305, as seen in FIG. 18. Together with additional enclosure panels 322A, 322B and 324 of air handler extension assembly 327 (shown in FIGS. 17 and 18 and further described below), enclosure panels 316, 318 and 320 form the sides, bottom and back of the enclosure for the base portion of frame 304.

Figure 20:
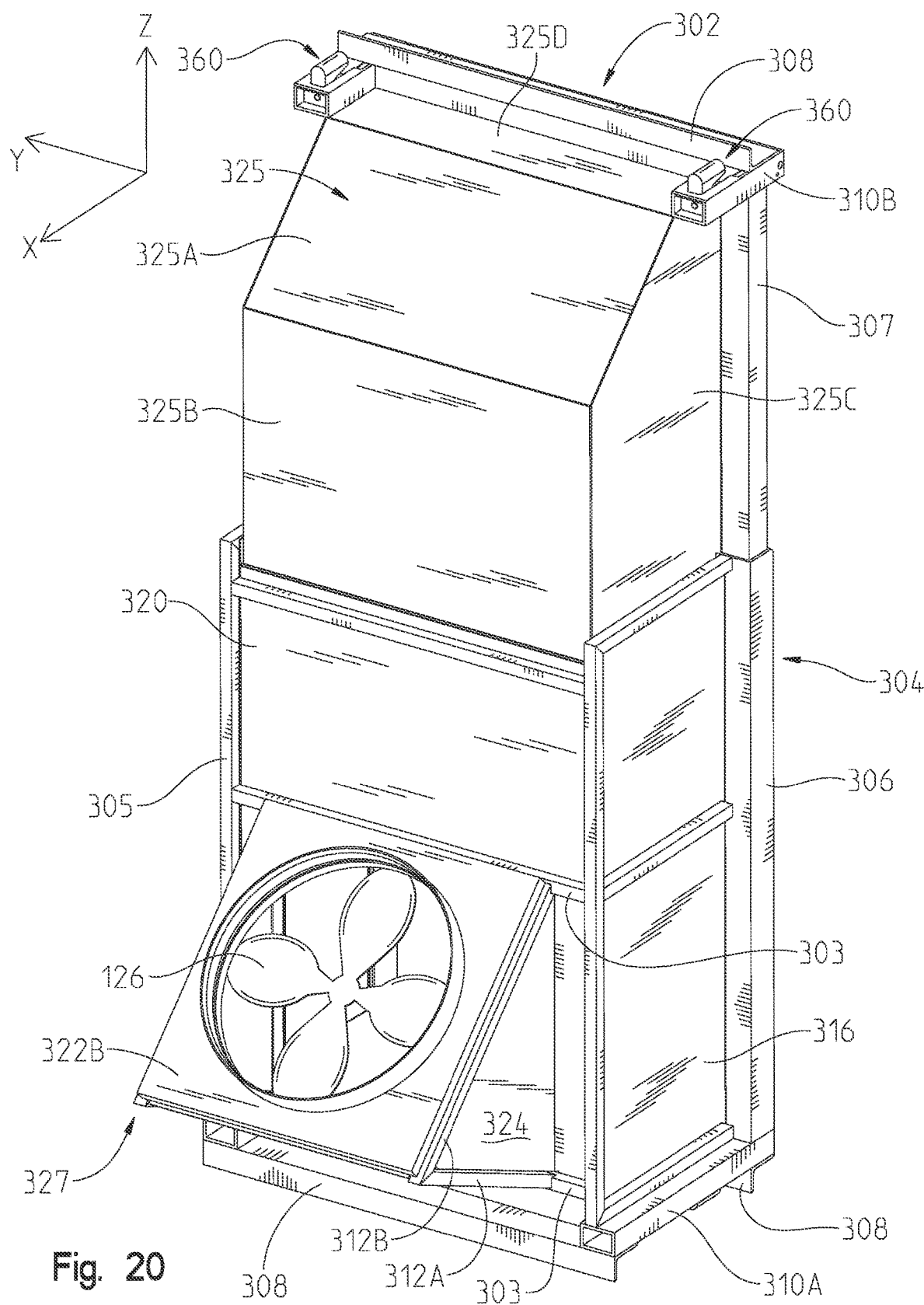
FIG. 20 is another perspective view of the air handler assembly shown in FIG. 19.

For the telescoping frame portion of frame 304, telescoping enclosure 325 provides the top of the enclosure assembly and allows for extension and retraction of the side and back enclosures formed by panels 316 and 320 respectively. As best shown in FIGS. 18 and 20, telescoping enclosure 325 includes a slideable rear enclosure panel 325B positioned adjacent and/or abutting rear end enclosure panel 320. Enclosure 325 further includes a pair of side enclosure panels 325C which are positioned adjacent and/or abutting respective side enclosure panels 316. Finally, enclosure 325 includes top enclosure panels 325A and 325B. In the illustrative embodiment of FIGS. 18 and 20, top enclosure panel 325A is angled to facilitate smooth airflow through the enclosure of air handler assembly 302.

Telescoping enclosure 325 may be formed as a folded and/or welded piece of metal or plastic sheet material to promote air tightness and dimensional stability. In the illustrative embodiment of FIGS. 18 and 20, telescoping enclosure 325 is fixed, such as by welding or fasteners, to the upper frame members 310B at the left and right sides, as well as to the laterally extending frame member 308. Telescoping enclosure 325 may remain unattached to upright frame sliders 307 to allow sliders 307 to be received within upright frame members 306 (FIG. 22) without interference from enclosure 325. Thus, as frame sliders 307 are moved up and down, enclosure 325 moves up and down with the rest of the telescoping portion of frame 304, while a continuous air barrier is presented by enclosure 325 and the adjacent and/or abutting panels of the enclosure assembly of the base portion of frame 304.

Figure 21:
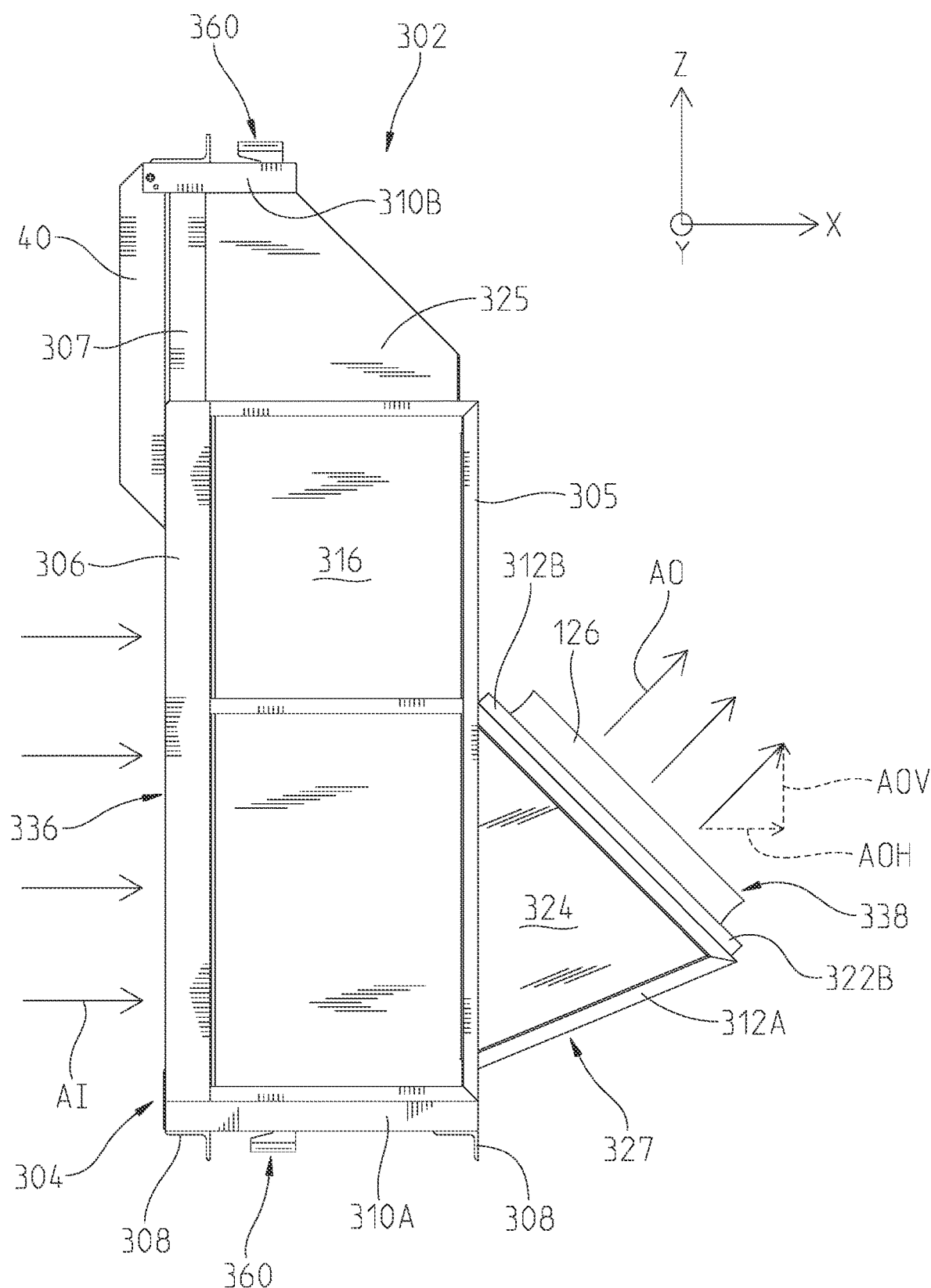
FIG. 21 is a side elevation view of the air handler assembly shown in FIG. 17, illustrating an exemplary airflow pattern therethrough.

Turning now to FIG. 21, air handler extension assembly 327 protrudes and extends rearwardly from frame 304, and in particular, assembly 327 extends rearwardly from the vertical YZ plane generally defined by rear enclosure panel 320 (FIG. 18) and the rear uprights of subframes 305 to which panel 320 may be affixed. As best seen in FIG. 18, extension assembly 327 includes angled rear enclosure panel 322B which extends rearwardly and downwardly from a junction with a transverse frame member 303 extending laterally between the left and right subframes 305. Rear enclosure panel 322B and its supporting frame members 312B define angle θ with the YZ plane (FIG. 22) in similar fashion to rear enclosure panel 122 and its supporting angled frame members 112 (FIG. 14). In an exemplary embodiment, angled frame members 312B are fixed to the larger frame structure 304 via transverse frame member 303 (FIG. 18), and panel 322B is fixed to frame members 312B. Supported within angled rear enclosure panel 322B is air handler 126, which is the same air handler used in air handler assembly 102 described above. Air handler 126 defines airflow aperture 338, as best shown in FIG. 21.

Figure 16B:
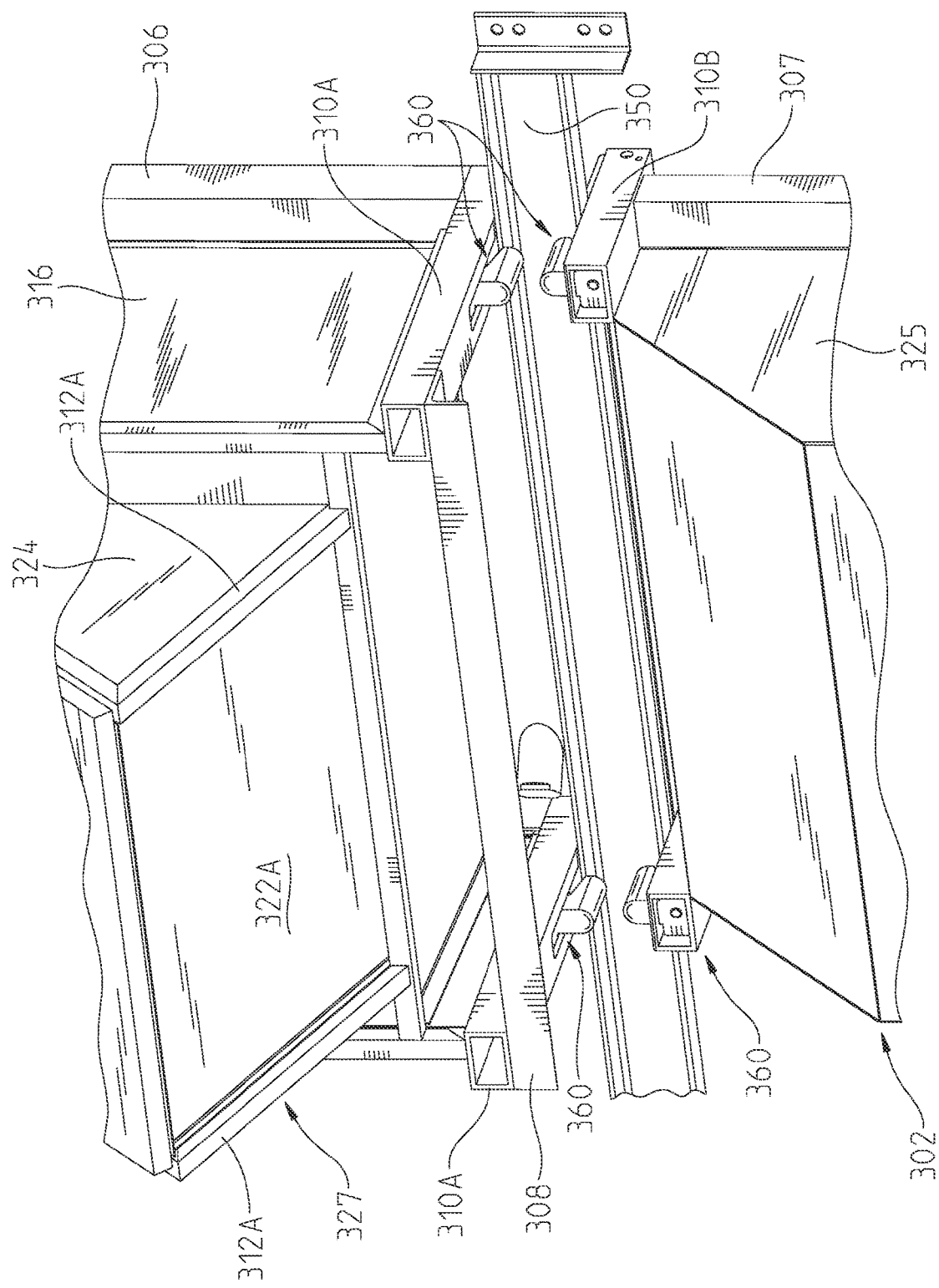
FIG. 16B is a perspective view of the attaching mechanisms that clamp the air handler assembly to the racks.

Air handler extension assembly 327 further includes lower angled frame members 312A which extend from the rear and lower end of upper angled frame members 312B back to the YZ plane formed by the rear uprights of subframes 305. Another lateral frame member 303 (FIG. 18) may be provided to fix frame members 312A to the larger frame 304. In an exemplary embodiment, all junctions between frame members are fixed by welding, though of course other fixation methods may be employed. A lower angled rear enclosure panel 322A, shown in FIG. 16B, is supported by frame members 312A. A pair of side-rear enclosure panels 324 enclose the generally triangular opening formed between frame members 312A, 312B and their adjacent subframes 305. In the illustrative embodiment of FIG. 18, these side rear enclosure panels 324 include a triangular portion which extends along a front-to-back direction in the XZ plane, as well a generally rectangular portion extending in a YZ plane between frame members 312A, 312B and the upright of subframe 305.

Therefore, enclosure panels 322A, 322B, and 324 substantially enclose air handler extension assembly 327, such that its interior volume cooperates with the interior volume within frame 304 to define the enclosed space within air handler assembly 302. Similar to air handler assembly 102 described above, this enclosed space receives and discharges airflow only through the upright airflow aperture 336 and the angled airflow aperture 338, while all other possible airflow pathways are substantially or completely blocked by the enclosure panels described above.

Figure 25:
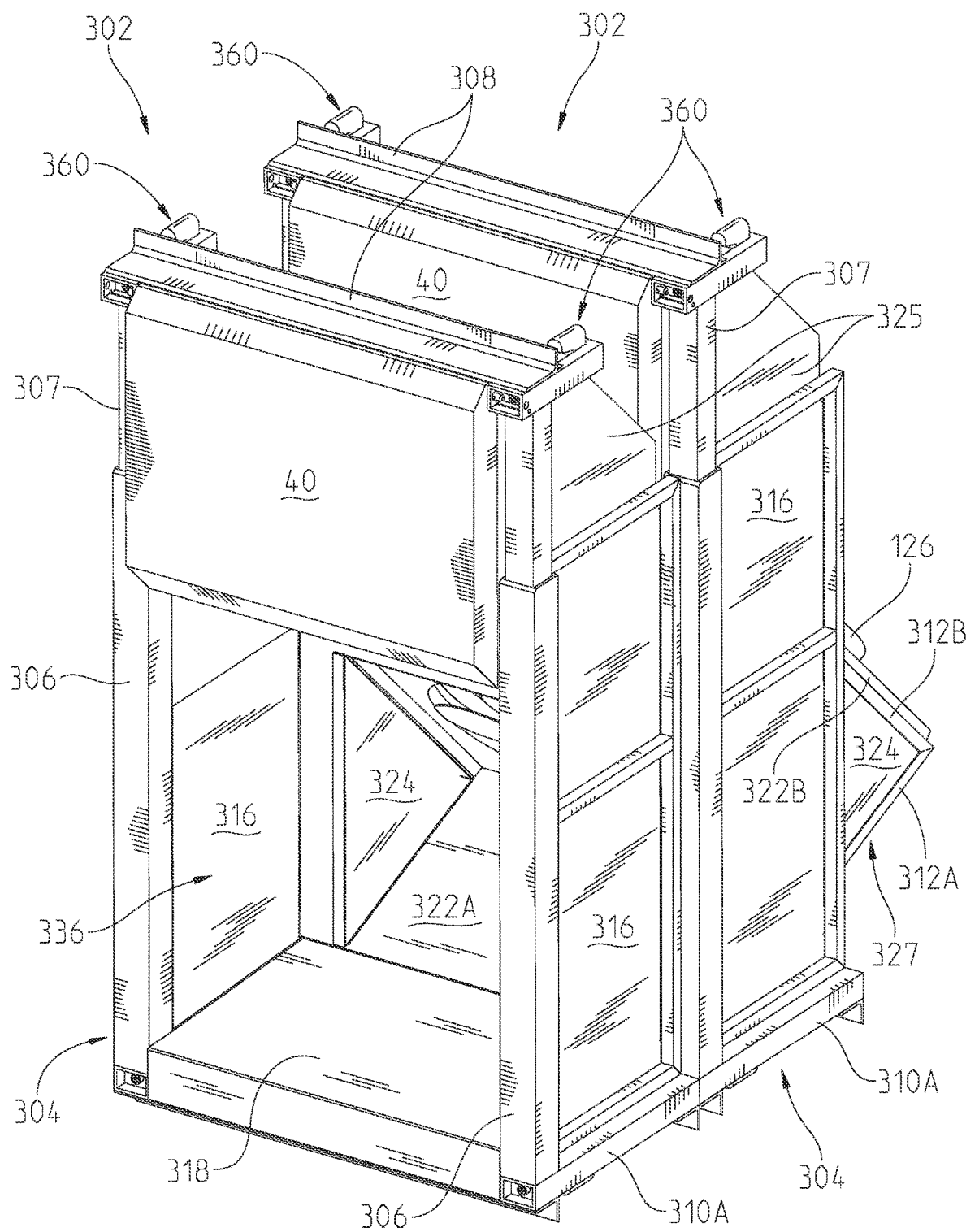
FIG. 25 is a perspective view of two of the air handler assemblies of FIG. 17, in which the air handler assemblies are nested for optimal storage and transportation.

Turning again to FIG. 18, air handler extention assembly 327 and its constituent components define an overall width which is less than the width of upright airflow aperture 336. As best seen in FIG. 25, this allows air handler extension assembly 327 of a first air handler assembly 302 to be received between upright frame members 306 and into the enclosure of the base frame 304 of a second, adjacent air handler assembly 302. In this "nested" arrangement, air handler assemblies 302 may be lined up one next to the another and nested such that only the width of frame 304, excluding the rearward extension of assembly 327, taken up by each neighboring assembly 302 within a collection of nested assemblies. This allows a greater number of assemblies 302 to be contained within a given volume, such as for storage and transport, than would otherwise be possible if the full width of each assembly 302 needed to be accommodated.

3. Use of Individualized Air Handlers for Modular Operation

As noted above, air handler assemblies 102, 302 may be used in conjunction with 2-deep rack 100 to create a modular system of forced air transfer through palletized product assemblies 52, in which each air handler assembly 102, 302 provides a dedicated air transfer mechanism for a given pallet bay. With rack 100 installed in a desired location, such as a cooling or thawing warehouse 2 (FIG. 1), air handler assemblies 102 and/or 302 may be installed into one or more rearward pallet bays as shown in FIGS. 10, 11, 15 and 16 and described above. In an exemplary installation, forklift 18 (FIG. 3) is equipped with a pantograph in order to allow for a "reach" by the forks into the rearward bay position, as is commonly performed with palletized product in 2-deep storage configurations. This long-reach forklift 18 places air handler assembly 102 or 302 in the rearward position of a desired pallet bay with first airflow aperture 136 facing forward into the adjacent forward bay, and the second airflow aperture 138 facing rearwardly away from the forward bay.

Alternatively or in addition to the use of a long-reach forklift 18, an interface device may be used that attaches between the forklift 18 and the air handler assembly 102 or 302 that facilitates field placement and removal from the racking assembly 100. Fixed or removable devices may be provided that allow engagement, lifting and movement of the air handler assembly 102 or 302 by the interface device.

In some applications, air handler assembly 102 or 302 may be used as a stand-alone unit independent of any racking. For example, air handler assembly 102 or 302 may be placed on a floor adjacent to a palletized product assembly 52, and activated in order to induce a forced airflow through assembly 52 as described herein. Assemblies 102, 302 may be equipped with attachment holes that enable the units to be fastened directly to the floor, in addition to being fastened to the racking system. In one embodiment, a heavy-duty floor mounting assembly may be provided with a robust design to tolerate significant impact forces that would otherwise have the potential to damage air handler assembly 102 or 302. Moreover, assembly 302 provides for either floor mounting (e.g., using anchors) or rack mounting. A single-unit racking structure may also be provided to receive a single pallet assembly 52 in the same manner as rack assembly 100.

With air handler assembly 102 placed in the desired location, frame 104 may be secured to the adjacent support surface of rack 100 (e.g., horizontal racking beams) in order to prevent air handler assembly 102 from being pushed rearwardly or otherwise jostled out of place when palletized product assembly 52 is loaded into the forward bay. Such securement may be accomplished by angle brackets connected to base support members 114 of frame 104 and bolted to the adjacent support members of rack 100, for example. In an exemplary embodiment, such brackets may be positioned to take advantage of existing pallet support holes typically found in commercially available 2-deep racking 100. Alternatively, securement of air handler assembly 102 to rack 100 may be accomplished by any other suitable method, such as via bolts, pins, clamps, and the like.

In one exemplary embodiment, air handler assembly 302 may be secured to rack 100 via upper and lower pairs of attachment mechanisms 360, as shown in FIGS. 17 and 22. Attachment mechanisms 360 each include fixation slider 362 which is slideably received within an adjuster housing, which in the illustrated embodiment may be the tubular void formed within lower frame member 310A and upper frame member 310B, respectively. To this end, fixation slider 362 may include a slider block portion 366 which is sized to be slideably received within the tubular void and to slide along the longitudinal axis L formed by frame members 310A, 310B. A fixation arm portion 364 of fixation slider 362 protrudes outwardly from the frame member 310A or 310B via slider slot 372. As best shown in FIG. 24, each slider slot 372 may include a widened portion which allows slider block 366 to be lowered into the longitudinal void within each frame member 310A, 310B. This widened portion of slot 372 may then be partially (or entirely) covered by laterally extending frame member 308 such that fixation slider 362 becomes slideably captured within its respective frame member 310A or 310B.

A slider adjuster 370, illustratively a long bolt having a threaded shaft and a bolt head, is received through a central aperture formed in adjuster fitting 376 (FIGS. 22 and 23), and threadably received by a correspondingly threaded aperture 368 formed through slider block 366 of fixation slider 362 (FIGS. 23 and 24). The central aperture in adjuster fitting 376, the threaded aperture 368 of slider block 366, and the longitudinal axis defined by slider adjuster 370 are all coaxial with longitudinal axis L defined by the longitudinal void of the adjuster housing. As slider adjuster 370 is rotated with the bolt head bearing against adjuster fitting 376, fixation slider 362 moves longitudinally along longitudinal axis L, with fixation arm 364 advancing either toward or away from a bearing surface 309 of laterally extending frame member 308 (FIG. 24). In alternative embodiments, slider adjuster 370 and its associated structures may be replaced by other linear actuators, such as air cylinders or the like. In an exemplary embodiment, bearing surface 309 is substantially perpendicular to the longitudinal axis of the adjuster housing in order to create an abutment surface with an adjacent cross beam 350, as shown in FIG. 22 and further described below.

In use, air handler assembly 302 is installed to rack 100 at a rear bay thereof, as shown in FIG. 16A. Assembly 302 may be rested upon, and supported by a lower cross beam 350, as best shown in FIG. 22. While so supported, air handler assembly 302 may be advanced rearwardly until bearing surface 309 abuts the adjacent vertical surface of frame 350. The telescoping frame may then be advanced upwardly by sliding upright frame slider 307 out of upright frame members 306 until front-to-back frame member 310B abuts the lower surface the upper cross beam 350. Frame member 310B may then be slid backwardly, as needed, until bearing surface of 309 of laterally extending frame member 308 abuts the adjacent vertical surface of the upper cross beam 350. In one exemplary method of operation, the telescoping frame is raised by forklift or mechanical means. Threaded set-screws or other fixation devices may be provided to fix the inner and outer telescoping members at a desired height and configuration.

With laterally extending frame members 308 both in place and abutting their respective cross beams 350, attachment mechanisms 360 are actuated by slider adjusters 370 to draw each respective fixation slider 362 forwardly until an angled surface 378 thereof engages a portion of cross beam 350 (i.e., a leg of the U-shaped beam) as shown in FIG. 22. Angled surface 378 faces toward the adjacent horizontal surface of the respective frame member 310A or 310B, and is configured such that a progressively narrowing gap is formed between angled surface 378 and the adjacent surface of frame member 310A or 310B. Therefore, as angled surface 378 advances further forwardly, it vertically "squeezes" or pinches the portion of cross beam 350 between fixation slider 362 and frame member 310A or 310B (i.e., along the Z-direction). In addition, cross beam 350 becomes squeezed or pinched in a horizontal forward-to-back direction (i.e., along the X-direction) between angled surface 378 and bearing surface 309 of laterally extending frame members 308.

In an exemplary embodiment, attachment mechanisms 360 are provided at each corner of frame 304, i.e., the upper left, upper right, lower left and lower right corners as viewed by an operator facing upright opening 336. Further, as shown in FIG. 16B, a U-shaped cross beam 350 may be used to support both a lower and upper air handler assembly 302, engaging the upper right and upper left corners of the lower air handler assembly 302 and the lower left and lower right corners of the upper air handler assembly 302. Alternatively, racking adapters may be provided for fastening assembly 302 to different styles of racking, as required or desired for a particular application. Such racking adapters may include tool-less, welded, drilled, fabricated structures.

Palletized product assembly 52 may then be loaded into the adjacent forward bay or rack 100 in front of air handler assembly 102 or 302, such as by operation of forklift 18. The rearward surface of palletized product assembly 52 is abutted against airflow aperture 136, and may pivot swing seal 40 along pivot direction S (FIG. 14) in order to form a top seal. When fully installed, palletized product assembly 52 substantially or completely blocks aperture 136 and forms a substantially air tight seal therewith. In one embodiment, airflow aperture 136 has a width of about 30 inches, such that a standard-width palletized product assembly (i.e., 40 inches or 48 inches depending on orientation) can be expected to fully block aperture 136 even without perfect side-to-side alignment of palletized assembly 52.

With the air handler assembly 102 and/or 302 and palletized product assembly 52 placed within rack 100 and sealingly engaged with one another, air handler 126 may be activated to drive an airflow through the palletized product assembly 52 and along the airflow pathway formed between airflow apertures 136, 336 and 138, 338 of air handler assembly 102, 302. Where the ambient air around rack 100 is maintained at a temperature differential compared to palletized product assembly 52, such as with freezing air and above-freezing product contained within cases 22, the air flow induced by air handler 126 or 336 can effect heat transfer between the ambient air and palletized product within cases 22, there by promoting a thorough, evenly distributed, and rapid heat transfer throughout the product contained within palletized product assembly 52.

Additional air handler assemblies 102 and/or 302 may be installed within additional pallet bays of rack 100 as required for a particular application. Advantageously, any number of air handler assemblies 102, 302 may be installed depending on how many individual palletized product assemblies 52 are desired for use with rack 100. Moreover, as palletized product assemblies 52 are removed from various pallet bays, the adjacent air handler assemblies 102, 302 may be deactivated and/or removed in order to avoid unnecessary energy expenditure and/or space utilization. In some applications, the row of floor-position bays in rack 100 may be left vacant to allow for driveways for forklifts 18 (FIG. 3) or other warehouse equipment, or to provide staging areas for palletized product 52 as they await final positioning with rack 100 or withdrawal from warehouse 2. Advantageously, the use of air handler assemblies 102, 302 allows for the lower row to be vacated without substantial reconfiguration of rack 100, while still allowing the upper bays to remain functional.

As noted above, the rectangular cuboid shape of air handler assemblies 102 facilitates storage, transport, and selective deployment of any number of air handler assemblies 102 to a warehouse or other facility. Frame 104 of air handler assembly 102 facilitates stacked storage of multiple air handler assemblies 102 in a relatively small space, such as a room or corner of a warehouse such as warehouse 2. When needed, a desired number of air handler assemblies 102 may be retrieved from the storage area and loaded into rearward pallet bays as needed. When the forced air operation on palletized product assemblies 52 is complete, air handler assemblies 102 may be withdrawn from rack 100 and placed back into storage.

In one exemplary embodiment, as exemplified by air handler assembler 302 shown in FIG. 25, air handler extension assembly 327 is narrower then opening 336 in the lateral and vertical dimensions, such that the entirety of air handler extension assembly 327 may be received within the adjacent enclosure of an adjacent air handler assembly 302. A series of air handler assemblies 302 may be nested in this fashion to create an appropriate aggregate width of connected assemblies 302 for a given storage or transport space, such as a warehouse or shipping container. When ready for use, each air handler assembly 302 may be retrieved by withdrawing the air handler 126 together with air handler extension assembly 327 from within the enclosure of the adjacent air handler assembly 302 and the installing air handler assembly 302 to the rack 100 as described in detail above.

In one embodiment, the storage area may be remote from the palletized product warehouse, and air handler assemblies 102 and/or 302 may be delivered as needed by transport truck or the like. For operators with seasonal businesses, such as fruit producers in Michigan or California for example, a set of air handler assemblies 102 and/or 302 may be delivered by transport truck at the time they are needed to condition and ship freshly picked fruit. When the harvest is complete, air handler assemblies 102 and/or 302 may be returned to a centralized location such as a manufacturer or distributor.

An air handler assembly of the present disclosure may include sidewall/top Extensions installed on the unit or in the racking (e.g., rack assembly 100) to adapt to different stack arrangements to control the path of airflow to improve the heat exchange. For example, drums, carts, tubs, trays, sacks, bulk packaging, or combo bins may be used. A pallet guide may be added to improve support and alignment of a pallet. Such a guide may be attached to air handler assemblies 102 and/or 302, to racking assembly 100, or to the floor.

4. Electrical Control and Automatic Operation

In one exemplary embodiment, air handler assemblies 102, 302 may be automatically controlled by controller 130, shown in FIGS. 12 and 13. In the context of the present application, control of air handler assemblies 102, 302 may include activation deactivation, adjustment for speed, and adjustment for fan direction, for example. Controller 130 is operably connected to occupancy sensor 134, which is configured and positioned to sense the presence or absence of palletized product assembly 52 in a forward pallet bay adjacent a given air handler assembly 102 or 302. For example, sensor 134 may be a pressure sensor located in the forward pallet bay, a light sensor located within the enclosure of air handler assembly 102 (as illustrated), a reed switch or other proximity sensor operably connected to swing seal 40, or any other suitable sensor. The same sensor arrangement may also be used in conjunction with air handler assembly 302 in the same manner as described herein. When senor 134 senses the presence of palletized product assembly 52 adjacent the air handler assembly served by sensor 134, an "occupied" signal is generated by sensor 134 and transmitted to controller 130. Controller 130 is programmed to activate the air handler 126, such as by powering motor 132 of fan 126 (FIG. 13), in response to the occupied signal from sensor 134. In an exemplary embodiment, controller 130 may be operably connected to a plurality of sensors 134 positioned throughout the array of pallet bays within rack 100, and may individually and selectively activate or deactivate the air handler 126 for each individual bay based on the presence or absence of palletized product assembly 52 within that bay. In addition, control systems described herein may be used for various chilling, tempering and freezing operations, which may include or exclude modular air handler assemblies 102, 302, and my be used in connection with racking 100 (FIG. 10), racking 14 (FIG. 8), other racking systems, or in floor-mounted systems.

Controller 130 may automatically initiate a forced air flow through palletized product assembly 52 upon loading such assembly into a forward pallet bay, thereby ensuring that heat transfer or other airflow functions are automatically performed by virtue of the palletized product assembly 52 being positioned in the pallet bay. Similarly, controller 130 may be programmed to cease the force air flow through pallet assembly 52 by deactivating air handler 126 when palletized product assembly 52 is absent from the adjacent bay. This "automatic" deactivation saves energy and reduces operational costs.

Turning to FIG. 12 another sensor 134A may be provided in connection with swing seal 40 for sensing the presence or absence of palletized product assembly 52 in a forward pallet bay adjacent a given air handler assembly 102 or 302. In particular, sensor 134A may be a rotation sensor which is activated as swing seal 40 is pivoted from a vertical position (as shown in FIG. 12) to an angled position along pivot direction S (FIG. 14) by interaction with an abutting palletized product assembly 52. Alternatively, sensor 134A may be a positional sensing switch activated by a surface of swing seal 40, or a hall-effect sensor activated by the nearby presence of the steel material of swing seal 40, for example.

In one exemplary embodiment, sensor 134 or 134A is a Lidar distance measuring device. Sensor 134, 134A may be positioned such that the sensor faces the direction the product to be loaded, such as pallet assembly 52. The controller 130 and sensor 134 or 134A may be located in a manner that provides the most effective sensing location.

Another sensor which may be employed to sense the presence or absence of palletized product assembly 52 in a forward pallet bay adjacent a given air handler assembly 102, 302 may be provided in the form of a pair of pressure sensors 133A, 133B shown in FIG. 14. As illustrated, an outlet pressure sensor 133A may be provided in the flow path of outlet air AO, or more generally within a sealed plenum receiving outlet air AO and adjacent a particular pallet bay to be monitored. An inlet pressure sensor 133B may similarly be provided in the flow path of inlet air AI, or more generally in the ambient air from which the inlet airflow AI is drawn. Sensors 133A, 133B provide output signals to controller 130 respectively indicative of the pressure of outlet air AO (or the ambient pressure within the sealed plenum and adjacent the pallet bay being monitored) and inlet air AI (or the ambient air near rack 100 from which inlet air AI is drawn).

When palletized product assembly 52 is present in a given bay, a differential between the outlet and inlet pressures registered by sensors 133A and 133B will be detected as a result of the pressure drop resulting from air impedance presented by palletized product assembly 52. Based on empirical data for a given application, a range of pressure drops associated with the presence of palletized product assembly 52 may be programmed in controller 130, and controller 130 may then compare the measured pressure drop against the programmed range. When the measured pressure drop is within the range (or, in some cases, remains within the range for a predetermined amount of time), controller 130 determines that palletized product assembly 52 is present in the adjacent bay and issues a signal to continue activation of fan 126. When the measured pressure drop falls below the range (or remains below the range for a predetermined period of time), controller 130 determines that palletized product assembly 52 is not sealingly engaged with opening 136 or is otherwise is not properly seated within the adjacent bay. Controller 130 then issues a signal or notification, such as a "red light" notification as detailed below, so that the system operator may adjust the seating of palletized product assembly 52 or otherwise troubleshoot the installation.

Yet another sensor may be provided in the form of temperature sensors 135A and 135B, shown in FIG. 14. A first temperature sensor 135A may be placed in the flow of outlet air AO or in the general vicinity of the air discharged from fan 126 (e.g., within a sealed plenum adjacent rack 100, if provided). A second temperature sensor 135B is placed in the flow of inlet air AI, or in the general ambient conditioned air within warehouse 2 containing rack 100. Sensors 135A, 135B provide output signals to controller 130 indicative of the temperature of outlet air AO and inlet air AI, respectively.

As the temperature of the product contained in palletized product assemblies 52 is undergoing adjustment (e.g., cooling from a warm state, freezing from a non-frozen state, thawing from a frozen state or heating from a cooled state), a temperature differential will be registered by controller 130 because the temperature of the ambient air which provides the inlet flow AI will be different from the temperature of the product, which in turn raises or reduces the temperature of the outlet flow AO. As the temperature of the product contained in palletized product approaches the temperature of the ambient air, however, this temperature differential will gradually reduce and eventually be eliminated. Controller 130 may monitor this temperature differential and compare such differential to a threshold, which may be a small nominal difference such as between 0.1-6.0 degrees Fahrenheit, for example. When the differential reaches the threshold (or, in some cases, remains below the threshold for a predetermined amount of time, such as several minutes), controller 130 may determine that the palletized product assembly 52 (or multiple assemblies 52) near one sensors 135A has reached its target temperature, and may therefore deactivate fan 126 in order to reduce ongoing energy usage. Target temperatures may be set at any desired level, such zero degrees Fahrenheit for freezing operations, or between 25-60 degrees Fahrenheit for product cooling used for vegetables and fruits.

Moreover, any combination of the sensors described herein may be provided in conjunction with controller 130, as required or desired for a particular application. For example, temperature sensors may be combined with presence/absence sensors so that the presence or absence of palletized product assembly 52 within a particular bay of rack 100 is known, and the relative state of heat transfer to the product within the cases 22 contained therein is simultaneously known. In addition to the sensor or suite of sensors providing signals to controller 130 for control over fan 126 and/or air handler(s) 8, controller may be programmed to periodically review the signal(s) received and reassess whether any action is needed on the basis of such signal(s). For example, controller 130 may have a "check interval" timer which, upon completion of a countdown, checks for the designated temperature differential, pressure differential, and/or activation of presence/absence sensor(s). Adjustments to operating parameters, such as activation or deactivation of fan 126 and/or air handler 8, may be performed per the programming of controller 130 (as described above). After such adjustments, the check interval timer may initiate a new countdown to the next check of sensor signals. While the time is counting down, controller 130 may ignore any changes of sensor signals. This operating modality, and the nominal time value for the check sensor timer, may be used to avoid "hunting" or unsteady behavior in the outputs of controller 130. In one embodiment, the check sensor timer is set at an interval between 1 and 3 minutes, such as about 2 minutes.

In addition to control over fan 126, air handler 8 and other systems associated with racking 100, controller 130 may also be provided to output notifications based on the status of the sensor or suite of sensors being monitored. For example, when a temperature differential derived from temperature sensors 135A, 135B (FIG. 14), reaches a threshold which indicates that the heat transfer operation (e.g., freezing, thawing, chilling or heating) is complete, controller 130 may output an "operation done" notification to the system operator. Similarly, controller 130 may output an "occupied" or "non-occupied" signal to indicate whether palletized product assembly 52 within a particular bay of rack 100 is present in any or all of the bays of rack 100.

Figure 29:
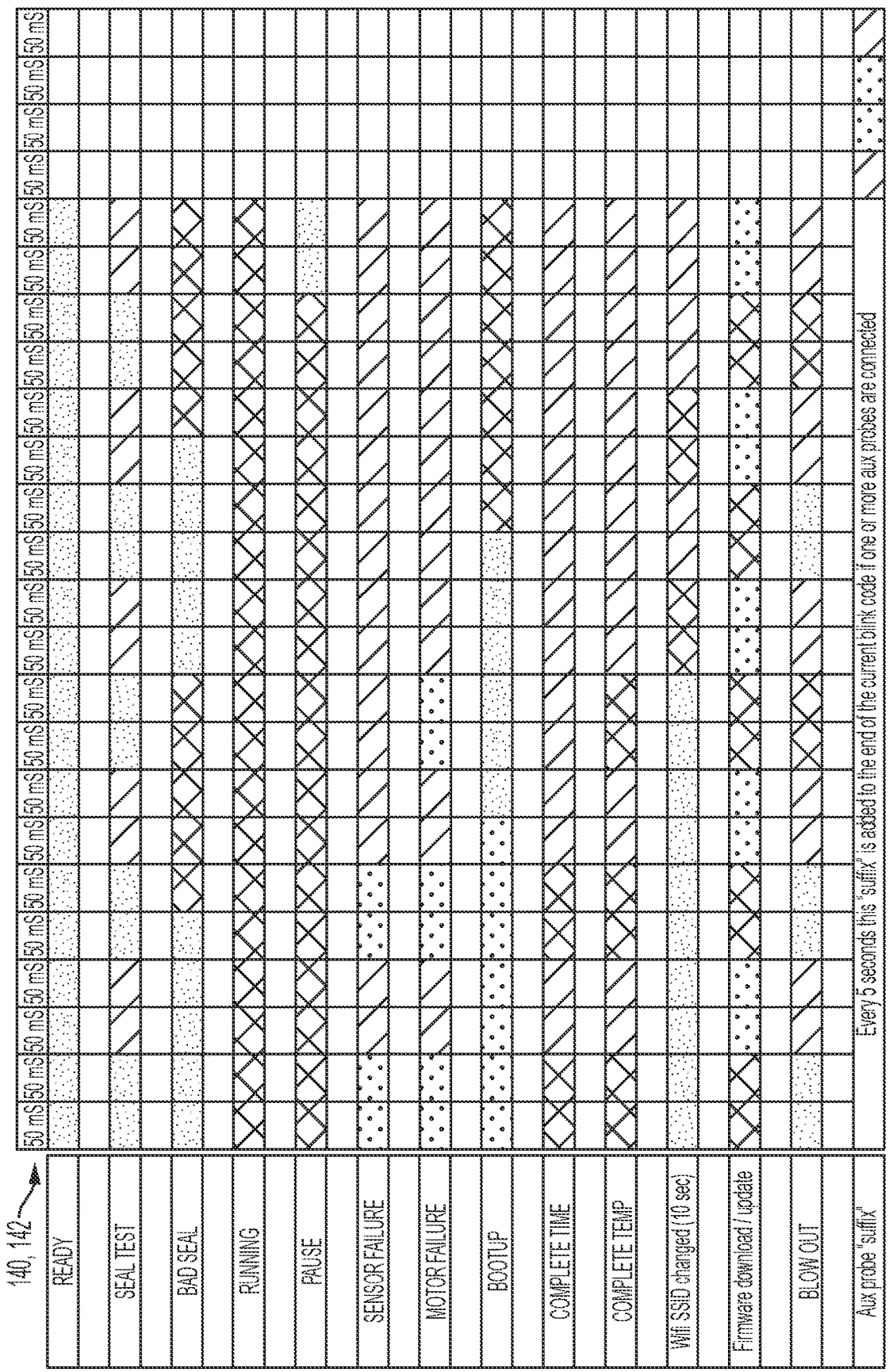
FIG. 29 is a schematic view of a plurality of light modes for alert lights made in accordance with the present disclosure.

In an exemplary embodiment shown in FIG. 29, the illustrated colors and method of displaying lights 140, 142, including blinking or solid light displays, may be used to indicate the status of the heat-transfer operation and trouble information. The placement of the lights 140, 142 allows for the visual alert to be seen through the open space at the bottom portion of pallet assembly 52, i.e., the space in the pallet 4 (FIG. 15) designed to receive forks of forklift 18 (FIGS. 3-4). Lights 140, 142 may also be "aimed" in a manner that illuminates the center board of the pallet 4 supporting the product cases 22. In an exemplary embodiment, lights 140, 142 are slightly recessed relative to the surrounding mounting surface in order to be protected from impact at loading/unloading.

In one exemplary embodiment, a set of changeable signals, such as multicolored lights, may be provided to output a succinct notification from controller 130 as to the state of the adjacent bay of racking 100 and its contents. For example, a green light on a given bay of rack 100 may be used to indicate that palletized product assembly 52 is present, and that the heat transfer operation is complete. A yellow light may indicate that palletized product assembly 52 is present, but the heat transfer operation is underway and not yet complete. A red light may indicate that palletized product assembly 52 is not present, and/or a fault condition has been detected (e.g., fan 126 is not functional, one or more sensors is not functional, etc.). Such lights may also be self-contained as a part of air handler assemblies 102 or 302. Referring to FIG. 17, for example, lights 140 and 142 may be provided along the bottom of frame 304 to provide a readily viewable indicator pertinent to the assembly 302 to which they are attached.

As noted above, a set of air handler assemblies 102 and/or 302 may be delivered to a site for activation at a time of need, and later removed from the site when the need has passed. To facilitate rapid set up and takedown of such a modular collection of air handler assemblies, each assembly 102, 302 may be electrically connectable to a neighboring assembly 102, 302 in a "daisy chain" style. For example, each assembly 102, 302 may include a junction box or similar electrical inlet at one side of frame 104 (e.g., one of the left or right side when facing airflow aperture 136, 336) and a corresponding outlet on the other side (e.g., the other of the left or right side when facing airflow aperture 136, 336). Cords may be provided to connect the electrical inlet of one assembly 102, 302 to the electrical outlet of a neighboring assembly 102, 302. This creates an electrical connection between the two neighboring assemblies 102, 302 which enables power-up or power-down of both assemblies 102, 302 based on a common command from controller 130, which may plug into the inlet at the end unit of the collection of assemblies 102, 302. In this way, a series of interconnected air handler assemblies 102, 302 may be provided with a common controller 130, and any number of assemblies 102, 302 may be provided according to the requirements of the application at hand.

Further, such a series of air handler assemblies 102, 302 may be provided at various locations, such as a series for each of multiple vertical levels along rack 100 (FIG. 10), or a series for each of a collection of racks 100 (FIG. 10). At the end of each series of interconnected air handler assemblies 102, 302, a connection may be made from controller 130 for individual control over each series, or a common electrical connection may be made for one or more series (e.g., via a busbar) for common control over multiple series.

Figure 27:
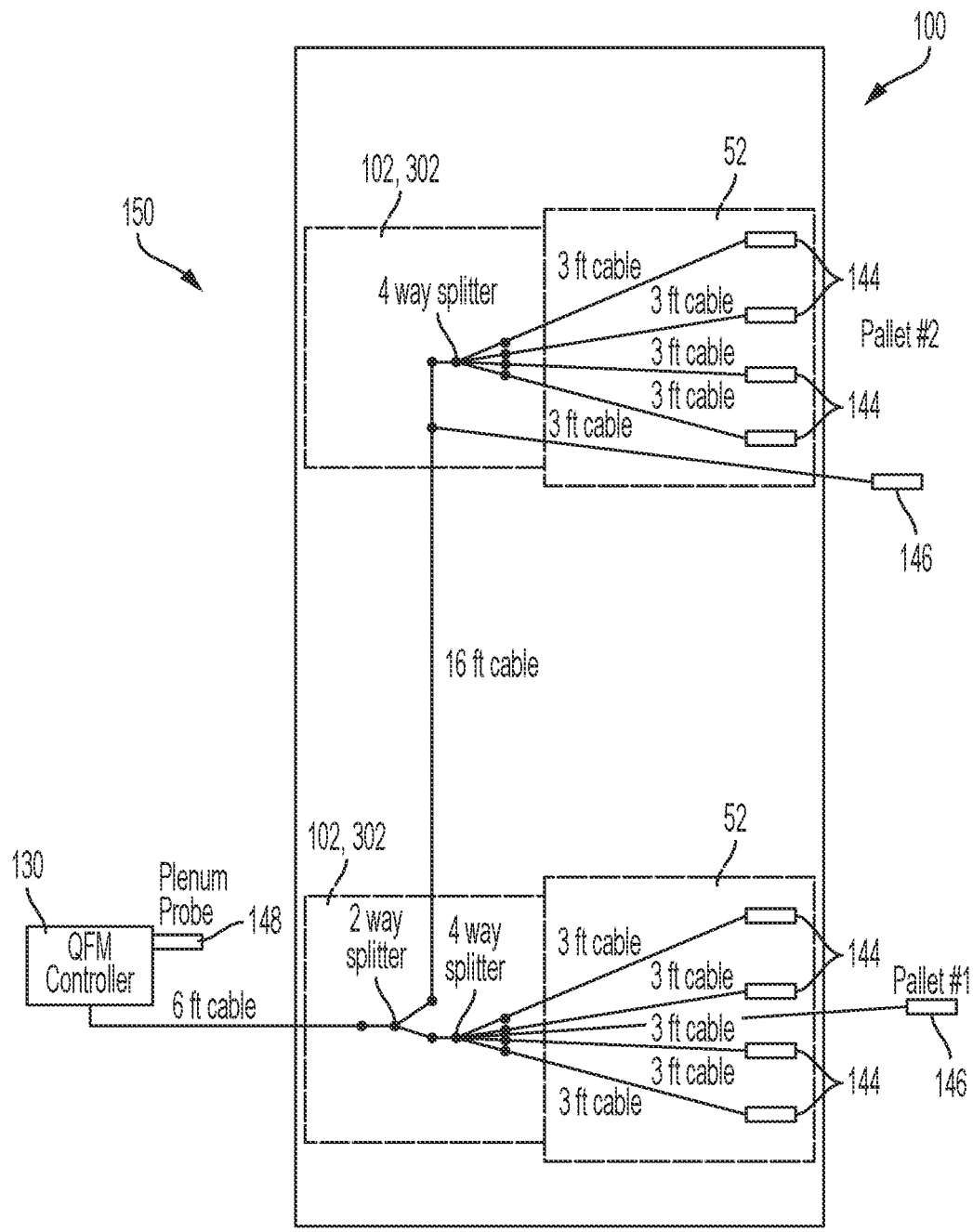
FIG. 27 is a schematic view of a racking assembly having a control system made in accordance with the present disclosure.

Referring now to FIG. 27, control system 150 may include one or more temperature sensors 144 used in connection with controller 130. Sensors 144 may take the form of probes or other contact-type temperature sensors distributed within the volume of pallet assemblies 52, any may be placed within the contents of individual cases 22 and roughly evenly spaced from one another. In this way, an array of the sensors 144 can measure a spatially-distributed change in temperature within the contents of pallet assemblies 52. In addition to providing sensors 144 within the contents of cases 22, they may also be provided within the airflow pathway, such as in airflow apertures 136, 336, to measure the temperature of the airflow at desired locations. In an exemplary embodiment, a 3.5 mm port is provided in connection with controller 130 to receive a flow of data from the sensors 144. FIG. 27 shows the use of four sensors 144 per pallet assembly 52, though it is contemplated than any number of sensors 144 may be used as required or desired for a particular application.

In addition to, or in lieu of, sensors 144, an infra-red (IR) or other contactless sensing system may be used in connection with controller 130 to assess temperature values. IR sensors may be oriented toward the pallet assembly 52, thereby measuring the surface temperatures of one more surface areas of pallet assembly 52. These area measurements create another data stream, which may be time-stamped similar to the temperature measurements from sensor 144. These contactless time/temperature data are transmitted to controller 130, which may use the contactless sensor data alone, or in conjunction with data from sensors 144 and/or 146 described herein, to ascertain the temperature and condition of products contained within palletized product assembly 52. This may in turn be used to control air handlers, provide data to users, and other end-use applications as described herein with respect to other temperature sensing technologies.

The contactless sensing system, such as an infra-red sensing system, may generate a range of values for different areas or points across the surface being measured. Each of these values may generate an independent time/temperature record similar to the above-discussed record created by sensors 144. In one analysis method, the coldest 10% of this range of nominal data sets may be subtracted from warmest 10% of nominal values to create a trendline. This trendline may allow the user (or controller 130) to assess the temperature change throughout the product contained on pallet assembly 52.

Controller 130 receives the temperature data from the sensors, which is then recorded along with a time stamp applied by a timer. In the illustrated embodiment, the time is integrated within controller 130, though a separate timer may be used. This feature enables the user to gather very accurate time/temperature data. As shown in FIG. 27, controller 130 is programmed to gather data from multiple external sensors 144 through the single data port using a series of cables and splitters. The controller 130 is programmed to discern the identity of each individual sensors 144 through the use of extensions and splitters (which may be in conformance to the 3.5 mm standard mentioned above), and to record the data from each sensor 144 to a data file. In this way, multiple data files are generated, with one file for each of the sensors 144. These files may then be analyzed individually or in the aggregate to ascertain the specific nature of the temperature-change (e.g., freezing) operation effected by air handler assemblies 102, 302.

Controller 130 may be equipped with a wifi system that enables each assembly 102, 302 to send and receive data pertinent to the heat transfer operation occurring within pallet assembly 52. The information transmitted by the wifi system include the time-stamped temperature data contained in the data files, time-stamped start and stop commands for fans 126 or other system components, product details pertaining to the products contained within cases 22 of pallet assemblies 52, error alerts, or other data as described herein. In one embodiment, the data may be configured in a manner that provides seamless integration with a Warehouse Management System (WMS) of the warehouse 2 (FIG. 1) with which controller 130 can interface. This feature enables the integration of pallet movement tasks (stocking, retrieval, hold, etc.) along with tying the time/temperature record to each pallet assembly 52 placed in rack assembly 100 (or, for traditional, non-modular freezing systems shown in FIGS. 2-8, racking 14).

For example, the wifi system may transmit the time/temperature record contained in the date files from the assemblies 102, 302, where such data is collected and initially stored, to a remote computer or storage medium for retention and/or analysis. The wifi system may also receive signals from the remote computer or storage medium, such as a signal to activate or deactivate or otherwise control a fan motor 132, 332 in response to the temperature readings received or a direct user input. Moreover, any of the control or data functions described herein can be issued, received or otherwise transmitted via the wifi system, including for internet- or cloud-based control and/or monitoring as described herein.

Figure 28:
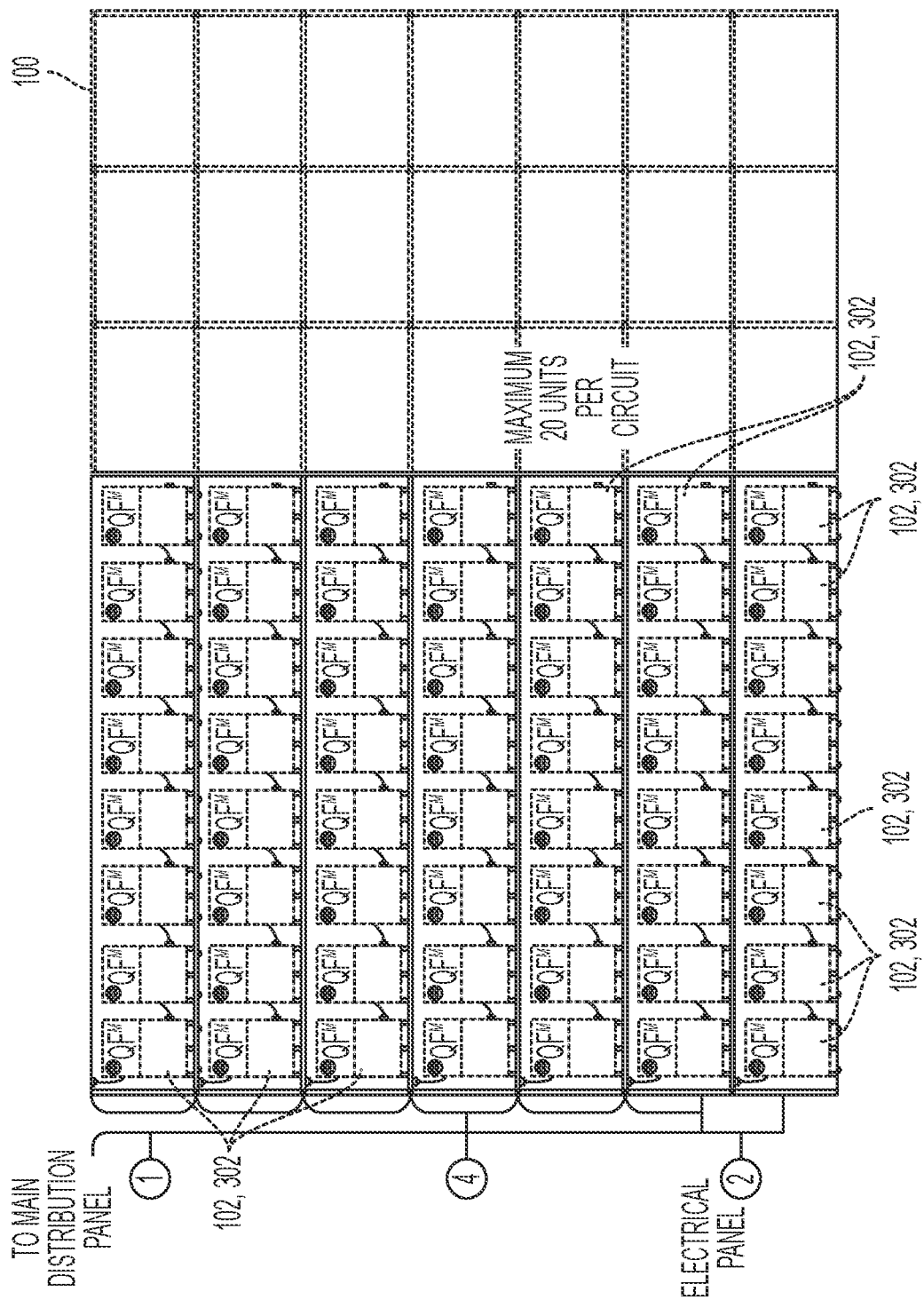
FIG. 28 is a side elevation view of an array of modular air handler assemblies contained within a racking structure and electrically wired for operation.

Controller 130 may be programmed with a dwell time, which is the time allotted for the system to operate to achieve a desired change in temperature, humidity or other environmental quality in the product contained in pallet assembly 52. Controller 130 may be integrated into a larger control system for an array of pallet positions, according to the wiring schematic shown in FIG. 28.

In one exemplary embodiment, a controller 130 is mounted to each assembly 102, 302. Controller 130 may be powered by a reduced voltage/power source integrated with the fan 126, 336. Therefore, each fan 126, 336 may be powered continuously and can then power the controller 130, regardless of whether the fan 126, 336 is activated with its high-voltage power source for fan motor 132, 332. This allows controller 130 to activate and deactivate its respective fan 126, 336, such that the controller 130 can initiate or cease a heat-transfer operation as needed. For example, controller 130 may initiate the heat-transfer operation when the occupancy of pallet assembly 52 in the adjacent pallet receiving space, and the need for temperature adjustment is indicated by sensors 144 (FIG. 27). In an exemplary embodiment, the temperature indicated by a plurality of sensors 144 distributed throughout pallet assembly 52 may be average to a single number for purposes of comparison to the threshold by controller 130.

For example, controller 130 may be programmed with a setpoint range of temperatures, such as between −5 and 5 degrees Fahrenheit for freezing operations, within which the set point is deemed to be satisfied. Above the set point or range, controller 130 initiates the heat-transfer operation. Similarly, the set point heat-transfer operation thresholds can be adjusted for tempering, warming or cooling operations as required or desired for a particular operation.

Conversely, controller 130 may cease the heat-transfer operation (by deactivating or slowing fan 126, 336) upon detection of an absence of pallet assembly 52 in the adjacent pallet receiving space or an indication from sensors 144 of a set point temperature having been reached. Advantageously, this integrated controller 130 coupled to fan 126, 336 significantly simplifies the power and control wiring and also enables the utilization of the fan's ability to go into continuous-run in the event of a control system malfunction, such that the heat transfer operation continues regardless of product temperature. This feature greatly helps protect product freezing.

As shown in FIG. 27, controller 130 may also be contained within the plenum space within or behind each assembly 102, 302. In one exemplary embodiment, controller 130 may be disposed within the space within the airflow pathway between aperture 136, 336 and aperture 138, 338. This enables the location of a distance sensor, temperature measurement sensor, pressure sensor, and other sensors within the plenum space while retaining short and simplified wiring to controller 130. In addition, a location within the plenum space protects the physical housing for controller 130 from shipping and other impact damage.

Referring again to FIG. 27, controller 130 may also be operably coupled to a very sensitive air pressure sensor 148 located within its housing or at another location within the airflow pathway. This air pressure sensor 148 enables the controller 130 to quickly determine whether the pallet assembly 52 placed in the pallet receiving space was loaded in a manner that will enable proper air flow through the product. In particular, the controller 130 compares a first ambient pressure reading prior to activating the fan 126, 336 with the pressure reading after the fan 126, 336 has been activated and is up to full operational speed. As described herein, the signals from sensor 148 may be used alone by controller 130 or combined with the signals from sensors 144, 146 and/or contactless temperature sensor data.

If the resulting measured pressure difference meets or exceeds a predetermined pressure difference threshold programmed in controller 130, the pallet assembly 52 is assumed to be properly loaded and controller activates light(s) 140, 142 (FIGS. 17 and 29) with a "pressure test passed, running cycle" light pattern to alert controller 130 and/or the operator that placed the pallet that the placement was acceptable as described herein.

On the other hand, if the pressure difference does not reach the threshold, placement is deemed to be unacceptable and remedial action is taken. For example, controller 130 may activate light(s) 140, 142 (FIGS. 17 and 29) with a "weak air seal, running cycle" light pattern to indicate the need for repositioning of the pallet assembly 52. The operator may then be given a predetermined amount of time to remedy the issue by setting the timer in controller 130. If the issue remains unresolved after the predetermined amount of time has elapsed, a further remedial action may be taken, such as an alarm being issued by controller 130. This alarm may also be transmitted via the wifi system to a remove computer or storage medium, which may then alert a central operations manager.

More generally, controller 130 may be programmed to use data received from the pressure sensors 148 (FIG. 27) to indicate inadequate airflow through pallet assembly 52 and/or air handler assemblies 102, 302. If controller 130 indicates such inadequate airflow, a user may be alerted as described herein.

Controller 130 may further be programmed with a dwell timer which operates fan 126, 336 for a predetermined amount of time. In one embodiment, the dwell time can be manually entered by a user of controller 130 at a time deemed appropriate for a specific product (e.g., different types of meat, produce, etc.). The predetermined dwell time programmed in controller 130 may be entered and/or adjusted through direct interfacing with controller 130 or remotely via the wifi system.

Controller 130 may be programmed to then automatically adjust the user-entered dwell time during a heat transfer cycle based on a signal received from a temperature sensor 146 (FIG. 27) positioned and configured to measure incoming air temperature from the area around palletized product 52. For example, time may be added to, or subtracted from, the remainder of a pre-programmed cycle time if the air temperature is warmer or colder (respectively) as compared to an expected temperature profile. The temperature profile may be pre-programmed in controller 130, and/or may be based on historic temperature profiles obtained from data collected in previously-monitored cycles. As described herein, the signal received from temperature sensor 146 may be used alone or combined with the signals received from sensors 144, 148, or from contactless sensors, by controller 130.

Controller 130 may also be programmed to automatically adjust the predetermined dwell time during a cycle based on the measured quality of a seal made between pallet assembly 52 and the adjacent opening to an air plenum, e.g., opening 54 (FIGS. 6 and 8), opening 136 (FIG. 12) or opening 336 (FIG. 17). A signal indicative of the quality of the seal may be formed from a combination of a measured difference in pressure between the space within plenum and the ambient air around pallet 52 (as described above), and/or a distance sensed by the sensor 134 or 134A (which may be a Lidar-type sensor as noted herein). Controller 130 is programmed to interpret larger pressure differentials and smaller distances as correlating with a tight seal, and to interpret smaller pressure differentials and larger distances as correlating with a poor seal. Controller 130 may be programmed to add additional time to the predetermined dwell time to compensate for an indication of a poor seal.

Controller 130 IoT—Data Logging, Remote Control, WiFi, JSON Communication Traceability—License Plate/Lot Info can be Associated with Freeze Data Controller 130 may be programmed to reduce electricity usage (e.g., by shutting down fans 126, 336) during certain hours of the day, such as during peak-demand hours. Controller 130 may follow a pre-programmed schedule entered by a user in the manner described herein with respect to other user-entered information. Alternatively, controller 130 may be programmed to dynamically adjust the speed, power and/or activation of fans 126, 336 based on signals or other information from a electrical utility company, such as utility demand incentives. This information may be retrieved from the internet by controller 130 or by a remote computer connected to controller 130, e.g., via the wifi system.

Controller 130 may be programmed to manipulate fan speed to maximize performance and energy efficiency. This may include pausing or pulsing of fan operation based on product-specific needs, varying speed at different points during product cycle, pausing phase change or temperature change of product for operations scheduling/needs and maximizing utility demand incentives.

Controller 130 may be programmed to reduce or terminate the speed of fan 126, 336 on one, some, or all air handler assemblies 102, 302 within an array of assemblies 102, 302 (FIG. 28) to compensate for inadequate refrigeration capacity. This reduction or termination of fan speed may be done on an ad-hoc (e.g., user-specified) or regular (e.g., time-of-day) basis, or according to other programming of controller 130.

Each individual type of product contained within pallet assemblies 52 may be "profiled" during an initial cycle to create a baseline protocol specific to that product. This baseline protocol may then be programmed into controller 130 and stored in memory. This baseline protocol may then be recalled and used on subsequent cycles for identical or related products. The product profile may be enhanced and improved by controller 130 with every subsequent cycle as the various implicated measurements are collected. For example, newly collected information may be stored in a database and compared to the previous measurements or profile. A/B testing may be implemented to discover improvements that may be made by modulating various controls of the fan 126, 336 and seal quality.

If controller 130 registers a deviation from the pre-programmed or otherwise established profile, which can include deviations in power consumption, pressure readings (especially pressure differentials as described above), temperature readings, distance readings, or other signals including the signals described herein, then an alert may be issued. For example, a message may be sent to a user indicated that an inspection of pallet assembly 52 is required.

A database may be maintained in connection with controller 130 that tracks the cumulative run time of motors 132, 332 of fans 126, 336. An alert, such as a user message, may be generated by controller 130 when regular maintenance is required based on the information stored in the database. The database may also track normal watt and amperage usage by the motors. When there is a deviation from the normal usage, an alert, such as a user message, may be generated by controller 130 calling for an inspection of the motor. At this time, motor error and condition codes may also be saved to the database.

Incoming (that is, supply) voltage and phase may monitored by controller 130 and reported to the user and/or database. Error codes and/or alerts may be generated by controller in response to incoming voltage or phase outside of a predetermined threshold range of acceptable values.

Controller 130 may download and install software and software updates to improve performance and reliability of assemblies 102, 302, such as through the wifi connection described herein.

Controller 130 may be programmed to restart fans 126, 336 and other system components automatically after a power interruption. In addition, controller 130 may be programmed to retain an indication of the cycle progress in a memory or database and then to continue the cycle at the retained indication after power is restored.

Controller 130 may be programmed to end the cycle (e.g., by discontinuing the operation of the fan) upon a determination that the desired process has been achieved. An alert may be issued, such as to the user via status lights 140, 142 or via an alert sent by the wifi system, when the cycle is complete. In one exemplary embodiment, the cycle is deemed complete by controller 130 when the product contained within pallet assembly 52 has reached a threshold temperature, as indicated by the signals issued by one or more temperature sensors 144 (FIG. 27).

Controller 130 may be programmed to receive signals from each air handler assembly 102, 302 indicative of utilization (e.g., the presence or absence of pallet assembly 52 in the adjacent pallet receiving space, and the activation or deactivation of the air handler assembly 102, 302). This data may be used to generate appropriate status lights at lights 140, 142 (FIG. 29) and may also be reported by controller 130 to a remote computer or storage medium. The data may be collected and aggregated in a database to assess overall utilization of the system. This includes time that the unit was not working properly, not being used, etc.

Controller 130 may be programmed to monitor the live state of all units in a system or in multitudes of systems, and to display and/or communicate this information to other systems including dashboard software, tv/computer monitors, reporting systems, email, text messages, etc.

Controller 130 may be programmed to control or manipulate air handler assemblies 102, 302 individually or together as a group.

A QR Code or other unique identifier may be included on each air handler assembly 102, 302, and can be monitored and tracked by controller 130 to provide live, real-time information about the location, performance, status and function of each air handler assembly 102, 302 to a centralized user or manager. The identifier may also be used to collect information from the on-site user of any individual air handler assembly 102, 302 or collection of air handler assemblies 102, 302, such as by a web-based form.

A bar code scanner can be plugged into or otherwise connected with controller 130 to scan SKUs of product to be included in the profile information programmed into the controller database, such as product-specific information. For example, a camera or laser scanner may be included in, or connected to, the controller 130. The camera or laser scanner may scan for and report any bar codes/QR codes observed on a nearby pallet assembly 52 and controller 130 may integrate this information into the cycle profile.

In addition, a label may be affixed to each air handler assembly 102, 302 that a user can scan to see live unit information, report issues to the manufacturer, and see compatible replacement parts and compatible accessories based on detailed bill-of-material (BOM) information compiled about that air handler assembly 102 or 302.

Controller 130 may be programmed to reverse the direction of the fan (e.g., fan 126 or 326) to clear debris after other sensors (e.g., occupancy sensor 134 shown in FIGS. 12 and 13, or other occupancy sensor described herein) issue a signal that a pallet assembly 52 has been removed from the adjacent pallet receiving space.

Controller 130 may be programmed to use data received from sensors 144, 146, 148 to indicate the presence of foreign objects in the plenum (such as stretch wrap). If controller 130 indicates such presence, controller 130 may alert a user (e.g., by status lights 140, 142 or other alerts ad described herein) to remove the foreign objects.

If there is an interruption to the communication system (e.g., the wifi system described herein), data packets (such as data pertaining to time-stamped temperature readings, system function, and other data as described herein) may be stored locally within controller 130 until communication with the remote server is re-established. When communication with the remote server is re-established, controller 130 may be programmed to send the locally-stored packets to the server with correct time stamps.

Controller 130 may be programmed to receive site specific information pertinent to each air handler assembly 102, 302, such as the installation location, owner information, rack location, SKU profile information, and wifi information. This can be pre-programmed or programmed by a user after installation at the site.

Controller 130 may be programmed to stop each air handler assembly 102, 302 according to a signals received from a 3rd party system. These signals may be hard wired to controller 130 or communicated wirelessly via the wifi system. These may include Building Management Systems for a given warehouse 2, such as fire protection, refrigeration controls, etc.

Controller 130 may convey information pertaining to the function and status of the system to a centralized data collection system. Such information may include room and product temperatures, wattage and amperage consumptions of fans 126, 336, wifi signal strength, and all other data described herein. The conveyance of information may be accomplished periodically, such as every 5 minutes. This information may be conveyed by a number of different controllers 130 at different installation sites, to allow centralized monitoring and/or control by a manufacturer, for example.

While this disclosure has been described as having exemplary designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A palletized product temperature management system, comprising:
   a pallet rack having a plurality of bays, each bay defining:
      a bay width sized to receive a palletized product assembly including a pallet with a plurality of stacked cases received thereon;
      a bay height sized to receive the palletized product assembly; and
      a bay depth sized to receive the palletized product assembly;
   an air handler positioned and configured to drive an airflow through at least one of the plurality of bays; and
   a control system comprising:
      an ambient air temperature sensor configured and positioned to sense an ambient conditioned air temperature;
      a contactless temperature sensor configured and positioned to sense a plurality of surface temperatures across an area of a surface of the palletized product assembly; and
      a controller programmed to issue a signal activating, deactivating or otherwise controlling the air handler and to receive a data stream indicative of the plurality of surface temperatures, the controller programmed to deactivate the air handler when the surface temperatures reach a predetermined threshold,
      wherein the contactless temperature sensor generates a range of values for the plurality of surface temperatures corresponding to different points across the surface of the palletized product assembly.

2. The system of claim 1, further comprising a lidar sensor positioned to face toward a respective bay, the controller programmed to activate the air handler when a pallet assembly is detected in the respective bay.

3. The system of claim 2, wherein the controller further comprises a dwell timer programmed to maintain activation of the air handler for a predetermined dwell time after the air handler is activated.

4. The system of claim 3, wherein the controller is programmed to automatically adjust the dwell time based upon whether the plurality of surface temperatures have reached the predetermined threshold at the expiration of the dwell time.

5. The system of claim 1, wherein the contactless temperature sensor is an infra-red (IR) sensor.

6. The system of claim 1, wherein the controller is programmed to deactivate the air handler while the surface temperatures are below the predetermined threshold, whereby the palletized product temperature management system is a cooling system.

7. The system of claim 1, wherein the controller is programmed to deactivate the air handler while the surface temperatures are above the predetermined threshold, whereby the palletized product temperature management system is a heating system.

8. The system of claim 1, further comprising a timer operably connected to the controller, the controller programmed to create a time-stamped trendline of the plurality of surface temperatures, wherein the controller assesses the trendline to determine a temperature change throughout the palletized product assembly over time.

9. The system of claim 8, wherein
   the trendline has a coldest portion of values from the data stream subtracted therefrom, and
   the trendline has a warmest portion of values from the data stream subtracted therefrom.

10. The system of claim 1, further comprising a temperature sensor used in connection with the controller and disposed in a pathway of the airflow, the controller programmed to determine a need for temperature adjustment based on a signal from the temperature sensor.

11. The system of claim 1, wherein the contactless temperature sensor is used in lieu of contact-type temperature sensors.

12. The system of claim 1, wherein:
   the air handler is positioned and configured to drive a heat-transferring airflow through the palletized product assembly via airflow pathways formed through the palletized product assembly, and
   the contactless temperature sensor is configured and positioned to sense the heat-transferring airflow among the plurality of surface temperatures.

13. A control system for a palletized product, the system comprising:
- a contactless temperature sensor configured to sense a plurality of surface temperatures at different locations across an area of a surface of the palletized product assembly, and to generate a range of values for the plurality of surface temperatures corresponding to different points across the surface of the palletized product assembly;
- an ambient air temperature sensor configured and positioned to sense an ambient conditioned air temperature; and
- a controller programmed to receive a first data stream from the ambient air temperature sensor and a second data stream from the contactless temperature sensor, the data stream containing the plurality of surface temperatures, the controller programmed to issue a deactivation signal to the air handler while the surface temperatures are within the predetermined threshold.

14. The system of claim 13, further comprising a lidar sensor positioned to face toward the palletized product assembly, the controller programmed to activate the air handler when the pallet assembly is detected.

15. The system of claim 13, wherein the controller further comprises a dwell timer configured to maintain activation of the air handler for a predetermined dwell time after the air handler is activated.

16. The system of claim 15, wherein the controller is programmed to automatically adjust the dwell time based upon whether the plurality of surface temperatures have reached the predetermined threshold at the expiration of the predetermined dwell time.

17. The system of claim 13, wherein the contactless temperature sensor is an infra-red (IR) sensor.

18. The system of claim 13, wherein the controller is programmed to issue the deactivation signal while the surface temperatures are below the predetermined threshold, whereby the control system is configured to operate a cooling system.

19. The system of claim 13, wherein the controller is programmed to issue the deactivation signal while the surface temperatures are above the predetermined threshold, whereby the control system is configured to operate a heating system.

20. The system of claim 13, wherein the contactless temperature sensor is used in lieu of contact-type temperature sensors.

21. A method of controlling a freezing system for palletized product, the method comprising:
- obtaining an ambient temperature data stream from an ambient air temperature sensor configured and positioned to sense an ambient conditioned air temperature;
- obtaining a surface temperature data stream from at least one contactless temperature sensor oriented toward a surface of the palletized product, wherein the surface temperature data stream is indicative of a plurality of temperatures across an area of the surface of the palletized product assembly, and the surface temperature data stream includes a range of values for the plurality of surface temperatures corresponding to different points across the surface of the palletized product assembly; and
- monitoring the surface temperature data stream to determine whether the plurality of temperatures have reached a threshold indicative of the palletized product being frozen; and
- deactivating an air handler when the step of monitoring results in a determination that the plurality of temperatures have reached a threshold.

22. The method of claim 21, further comprising:
- monitoring for presence or absence of the palletized product in a bay; and
- activating the air handler in fluid communication with the palletized product when the step of monitoring results in a determination that the palletized product is present in the bay.

23. The method of claim 21, wherein the step of monitoring comprises using an infra-red (IR) sensor.

24. The method of claim 21, further comprising maintaining the activation of the air handler for a predetermined dwell time after the step of activating the air handler.

25. The method of claim 21, further comprising:
- creating a time-stamped trendline of the plurality of temperatures, and
- assessing the temperature change throughout the volume of the palletized product over time, via the trendline.

26. The method of claim 25, wherein the step of creating the time-stamped trendline comprises subtracting a coldest 10% of values from the data stream, and subtracting a warmest 10% of values from the data stream.

* * * * *